(12) United States Patent
Ohno

(10) Patent No.: US 10,670,420 B2
(45) Date of Patent: Jun. 2, 2020

(54) INFORMATION OUTPUT SYSTEM, CONTROL METHOD, AND CONTROL PROGRAM

(71) Applicant: SHARP KABUSHIKI KAISHA, Sakai, Osaka (JP)

(72) Inventor: Michihiro Ohno, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 257 days.

(21) Appl. No.: 15/555,265

(22) PCT Filed: Mar. 1, 2016

(86) PCT No.: PCT/JP2016/056235
§ 371 (c)(1),
(2) Date: Sep. 1, 2017

(87) PCT Pub. No.: WO2016/140218
PCT Pub. Date: Sep. 9, 2016

(65) Prior Publication Data
US 2018/0195873 A1 Jul. 12, 2018

(30) Foreign Application Priority Data

Mar. 2, 2015 (JP) .................................. 2015-040519

(51) Int. Cl.
*G01C 21/36* (2006.01)
*G06Q 50/10* (2012.01)
(Continued)

(52) U.S. Cl.
CPC ....... *G01C 21/3664* (2013.01); *G01C 21/362* (2013.01); *G01C 21/3667* (2013.01);
(Continued)

(58) Field of Classification Search
None
See application file for complete search history.

(56) References Cited

U.S. PATENT DOCUMENTS

2006/0175753 A1* 8/2006 MacIver ............. A63F 3/00643
273/237
2010/0081378 A1* 4/2010 Kawamura ............. H02J 7/025
455/41.1
(Continued)

FOREIGN PATENT DOCUMENTS

| JP | 2005-56054 A | 3/2005 |
| JP | 2009-295075 A | 12/2009 |
| JP | 2014-16986 A | 1/2014 |

*Primary Examiner* — Navid Ziaeianmehdizadeh
(74) *Attorney, Agent, or Firm* — ScienBiziP, P.C.

(57) ABSTRACT

The present invention provides a technique that makes it possible to output, with a simple operation of a user, information which is relevant to an object displayed by a display device. A display device (10) includes: NFC antennas (150); a managing section (122) for managing, for each of the NFC antennas, antenna identification information and object location information such that the antenna identification information and the object location information are associated with each other; an NFC communication control section (121) for obtaining proximity information; and an information output section (123) for outputting relevant information which is associated with the object location information.

16 Claims, 18 Drawing Sheets

(51) Int. Cl.
*G06F 3/046* (2006.01)
*G06F 3/038* (2013.01)
*G06F 3/0485* (2013.01)
*G06F 3/03* (2006.01)
*G06Q 30/02* (2012.01)
*G06F 3/041* (2006.01)
*H04B 5/00* (2006.01)
*H04W 4/02* (2018.01)

(52) U.S. Cl.
CPC ............... *G06F 3/03* (2013.01); *G06F 3/038* (2013.01); *G06F 3/046* (2013.01); *G06F 3/0412* (2013.01); *G06F 3/0416* (2013.01); *G06F 3/0485* (2013.01); *G06Q 30/0251* (2013.01); *G06Q 30/0261* (2013.01); *G06Q 50/10* (2013.01); *H04B 5/0081* (2013.01); *H04W 4/02* (2013.01); *G06F 2203/0384* (2013.01); *G06F 2203/04806* (2013.01)

(56) References Cited

U.S. PATENT DOCUMENTS

| | | | | |
|---|---|---|---|---|
| 2013/0005250 | A1* | 1/2013 | Kim | H04N 21/4126 455/41.1 |
| 2013/0044051 | A1* | 2/2013 | Jeong | H04N 21/4126 345/156 |
| 2013/0247117 | A1* | 9/2013 | Yamada | G08C 17/02 725/93 |
| 2014/0004879 | A1* | 1/2014 | Matsushita | H04W 4/029 455/456.1 |
| 2014/0051354 | A1* | 2/2014 | Lee | H04B 5/00 455/41.1 |
| 2014/0215365 | A1* | 7/2014 | Hiraga | G06F 3/04883 715/765 |
| 2014/0252083 | A1* | 9/2014 | Lee | G06Q 30/0241 235/375 |
| 2014/0358681 | A1* | 12/2014 | Satoh | G06Q 30/0255 705/14.53 |
| 2015/0084893 | A1* | 3/2015 | Amagai | G06F 3/04883 345/173 |
| 2015/0185991 | A1* | 7/2015 | Ho | G06F 3/0484 715/771 |
| 2015/0201234 | A1 | 7/2015 | Hayakawa et al. | |
| 2016/0092047 | A1* | 3/2016 | Yoon | G06F 3/0482 715/798 |
| 2016/0196241 | A1* | 7/2016 | Kinoshita | G06F 13/385 715/206 |

\* cited by examiner (a)

| Latitude | XX.XX1 north latitude | XX.XX1 north latitude | ... |
|---|---|---|---|
| Longitude | YYY.YY1 east longitude | YYY.YY2 east longitude | ... |
| Relevant information | Detailed information about Castle A | Detailed information about the large statue of Buddha at Temple B | ... |
| ID | 04CDE172BA2B78 | 040CC972B92983 | ... |

(b)

| ID | 04CDE172BA2B78 | 040CC972B92983 | ... |
|---|---|---|---|
| NFC antenna | NFC antenna (0, 0)<br>NFC antenna (1, 0) | NFC antenna (2, 0) | ... |

US 10,670,420 B2

INFORMATION OUTPUT SYSTEM, CONTROL METHOD, AND CONTROL PROGRAM

TECHNICAL FIELD

The present invention relates to (i) an information output system which includes a display device including one or more antennas for carrying out short range communication, (ii) an information output system which further includes a mobile terminal that carries out short range communication with the display device, (iii) a method of controlling the information output system, and (iv) a program for controlling a computer to function as the information output system.

BACKGROUND ART

Techniques disclosed in recent years include techniques in which a user operates a mobile terminal with respect to an image displayed on a display so that the user obtains information relevant to the image.

For example, Patent Literature 1 discloses an information providing system in which pointing is carried out from a mobile information terminal with respect to a video image displayed on a display so that information relevant to the video image located at a pointing location is provided to the mobile information terminal. According to the information providing system, a superimposed video image, which has been obtained by superimposing an information video image on a captured video image captured by a video camera, is displayed on a display, and information concerning an information video image displayed at the pointing location is transmitted to the mobile information terminal.

Patent Literature 2 discloses an information distributing device that displays, on a display, display information having a hierarchical structure and then transmits, to a mobile communication device, transmission information based on an image and a distance which have been received, the image being an image which has been captured by the mobile communication device and which corresponds to the display information, and the distance being a distance between the mobile communication device and the display, which distance has been calculated from results of a focusing operation during capturing of the image.

Patent Literature 3 discloses a method of causing a mobile device, which can read a tag ID, and a screen to interact with each other. According to the method, a service UI is projected with use of a projector onto a tag matrix provided on a screen, and then the mobile device reads a tag ID(s) of one or more tags of the tag matrix and then transmits, to a server, the tag ID(s) thus read. Then, a server updates service data according to the tag ID(s) obtained, and then transmits the service data to the projector and to the mobile device. Then, the projector updates the service UI according to the service data obtained, and the mobile device displays a UI which is based on the service data obtained.

CITATION LIST

Patent Literature

[Patent Literature 1]
Japanese Patent Application Publication Tokukai No. 2005-56054 (Publication date: Mar. 3, 2005)

[Patent Literature 2]
Japanese Patent Application Publication Tokukai No. 2014-16986 (Publication date: Jan. 30, 2014)

[Patent Literature 3]
Japanese Patent Application Publication Tokukai No. 2009-295075 (Publication date: Dec. 17, 2009)

SUMMARY OF INVENTION

Technical Problem

However, according to the technique disclosed in Patent Literature 1 described above, the information transmitted to the mobile information terminal is associated only with the information video image. In other words, since the superimposed video image displayed on the display is not associated with the information transmitted to the mobile information terminal, it is unfortunately impossible to transmit information concerning, of the superimposed video image, the captured video image.

According to the technique disclosed in Patent Literature 2, the transmission information to be outputted is based on an image and on a distance between the mobile communication device and the display, which distance has been calculated from the results of a focusing operation during capturing of the image. This unfortunately forces a user to capture a precise image.

According to the technique disclosed in Patent Literature 3, the service data is associated with a tag ID, and is not associated with an image projected by the projector. Therefore, in a case where a projected image projected by the projector changes, it is unfortunately necessary for the server to update a correspondence table in which tag IDs correspond to respective pieces of information associated with a projected image.

The present invention has been made in view of the problems, and it is an object of the present invention to provide a technique which makes it possible to output, with a simple operation of a user, information which is relevant to an object displayed by a display device.

Solution to Problem

In order to attain the object, an information output system in accordance with an aspect of the present invention includes: a display device including one or more antennas which carry out short range communication, a managing section which manages (i) pieces of antenna identification information associated with respective ones of the one or more antennas and (ii) pieces of object location information that indicate locations of objects which locations are relative to a content in which the objects are contained, such that each of the pieces of the antenna identification information associated with a corresponding one of the one or more antennas is associated with one or more of the pieces of the object location information on corresponding one or more of the objects displayed within a certain range on the display device, which certain range is based on the corresponding one of the one or more antennas; a proximity information obtaining section which obtains proximity information that indicates an antenna, among the one or more antennas, to which a mobile terminal has come into proximity; and an output section which outputs relevant information associated with a piece of the object location information which piece indicates an object that is displayed within a certain range based on the antenna indicated by the proximity information.

In order to attain the object, an information output system in accordance with an aspect of the present invention including: a display device including one or more antennas which carry out short range communication; and a mobile terminal including an antenna which carries out short range communication, the display device further including a managing section which manages (i) pieces of antenna identification information associated with respective ones of the one or more antennas and (ii) pieces of object location information that indicate locations of objects which locations are relative to a content in which the objects are contained, such that each of the pieces of the antenna identification information associated with a corresponding one of the one or more antennas is associated with one or more of the pieces of the object location information on corresponding one or more of the objects displayed within a certain range on the display device, which certain range is based on the corresponding one of the one or more antennas, a proximity information obtaining section which obtains proximity information that indicates an antenna, among the one or more antennas, to which the mobile terminal has come into proximity, and an output section which outputs relevant information associated with a piece of the object location information which piece indicates an object that is displayed within a certain range based on the antenna indicated by the proximity information, and the mobile terminal further including a relevant information obtaining section which obtains the relevant information.

In order to attain the object, a method in accordance with an aspect of the present invention is a method of controlling an information output system, the information output system including: a display device including one or more antennas which carry out short range communication, the method including the steps of: managing (i) pieces of antenna identification information associated with respective ones of the one or more antennas and (ii) pieces of object location information that indicate locations of objects which locations are relative to a content in which the objects are contained, such that each of the pieces of the antenna identification information associated with a corresponding one of the one or more antennas is associated with one or more of the pieces of the object location information on corresponding one or more of the objects displayed within a certain range on the display device, which certain range is based on the corresponding one of the one or more antennas; obtaining proximity information which indicates an antenna, among the one or more antennas, to which a mobile terminal has come into proximity; and outputting relevant information associated with a piece of the object location information which piece indicates an object that is displayed within a certain range based on the antenna indicated by the proximity information.

In order to attain the object, a control program in accordance with an aspect of the present invention is a program for controlling a computer to serve as an information output system which includes a display device including one or more antennas which carry out short range communication, the program controlling the computer to serve as the following sections: a managing section which manages (i) pieces of antenna identification information associated with respective ones of the one or more antennas and (ii) pieces of object location information that indicate locations of objects which locations are relative to a content in which the objects are contained, such that each of the pieces of the antenna identification information associated with a corresponding one of the one or more antennas is associated with one or more of the pieces of the object location information on corresponding one or more of the objects displayed within a certain range on the display device, which certain range is based on the corresponding one of the one or more antennas; a proximity information obtaining section which obtains proximity information that indicates an antenna, among the one or more antennas, to which a mobile terminal has come into proximity; and an output section which outputs relevant information associated with a piece of the object location information which piece indicates an object that is displayed within a certain range based on the antenna indicated by the proximity information.

Advantageous Effects of Invention

With an aspect of the present invention, it is possible to output, with a simple operation of a user, information which is relevant to an object displayed by a display device.

DESCRIPTION OF EMBODIMENTS

The following description will discuss embodiments of the present invention in detail with reference to drawings.

Note that, for convenience, members having functions identical to those of the respective members of other embodiments are given respective identical reference signs, and descriptions of those members are omitted as appropriate.

Embodiment 1

Embodiment 1 of the present invention will be described in detail below with reference to FIGS. 1 through 8.

(Content Display System 1)

Figure 1:
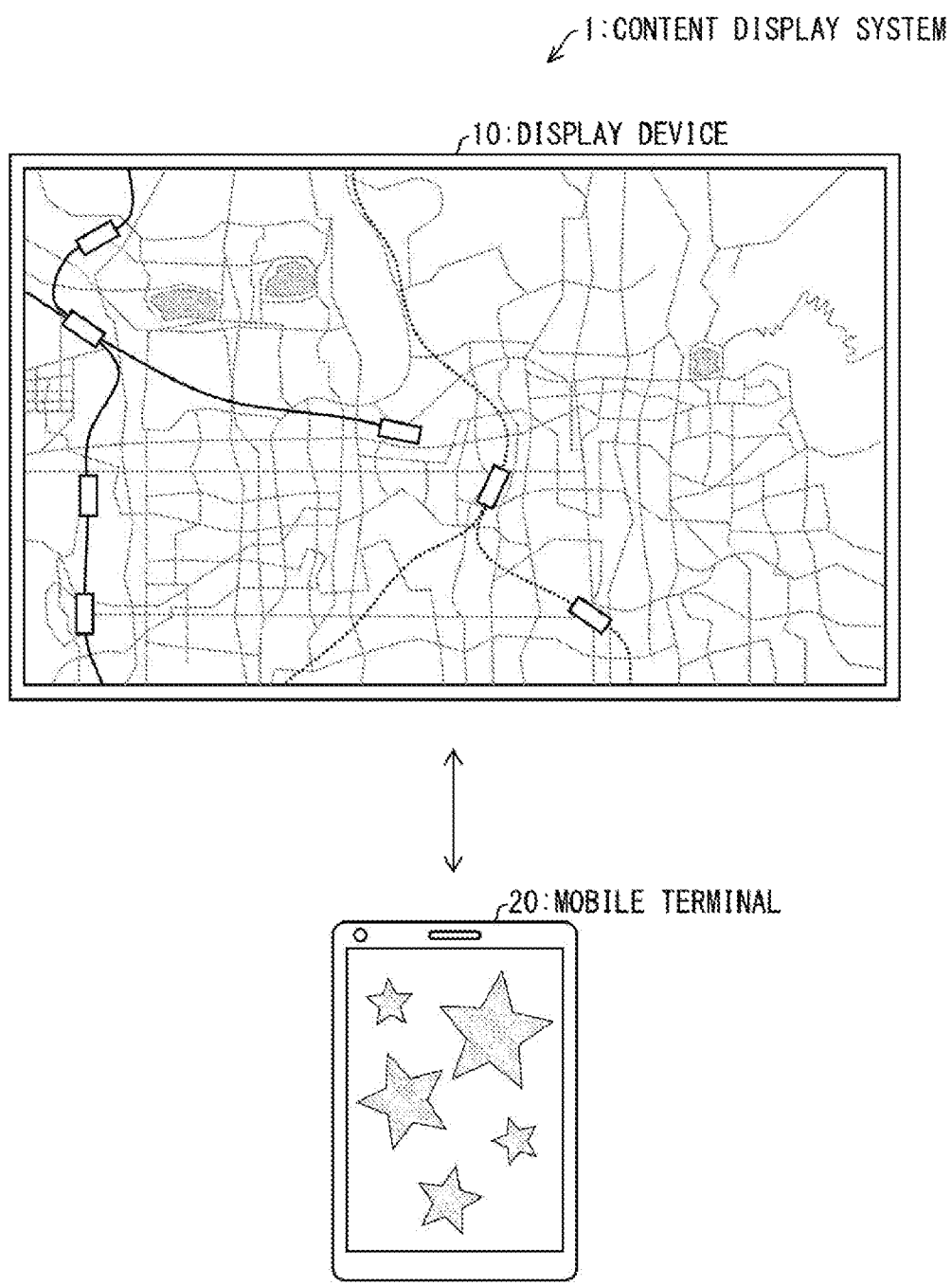
FIG. 1 is a view schematically illustrating a content display system in accordance with Embodiment 1 of the present invention.

FIG. 1 is a view schematically illustrating a content display system (information output system) 1 in accordance with Embodiment 1 of the present invention. As illustrated in FIG. 1, the content display system 1 includes a display device (information output system) 10 and a mobile terminal 20.

According to the content display system 1, the display device 10 includes one or more antennas for carrying out short range communication, so that the one or more antennas carry out short range communication with an antenna included in the mobile terminal 20. In a case where the display device 10 detects through short range communication that the mobile terminal 20 is in the proximity, the display device 10 supplies relevant information to at least one of (i) a display screen of the display device 10 and (ii) the mobile terminal 20. The relevant information is information that corresponds to a location at which the mobile terminal 20 is in proximity to the display device 10 and that is associated with an object included in a content displayed by the display device 10.

Note that the relevant information is preferably information which is relevant to an object at a location indicated by object location information that is associated with the relevant information. In such a case, the relevant information supplied is information relevant to an object to which the mobile terminal 20 has come into proximity. This allows a user to intuitively obtain the information.

Note that an NFC (Near Field Communication) is herein described as short range communication in the content display system 1. However, the short range communication is not limited to NFC. There are also no particular limitations on the number of NFC antennas or a location(s) at which an NFC antenna(s) are provided.

A content, which is actually displayed by the display device 10, is herein referred to as "display content". In addition, a content, which is not displayed by the display device 10 and is located in the vicinity of a display content, is referred to as "peripheral content". For example, in a case where the display device 10 displays a map, a target content to be displayed by the display device 10 is a map. In this case, a part of the map, which part is actually displayed by the display device 10, is referred to as "display content". Another part of the map, which part is not displayed by the display device 10, is referred to as "peripheral content".

(Display Device 10)

Figure 2:
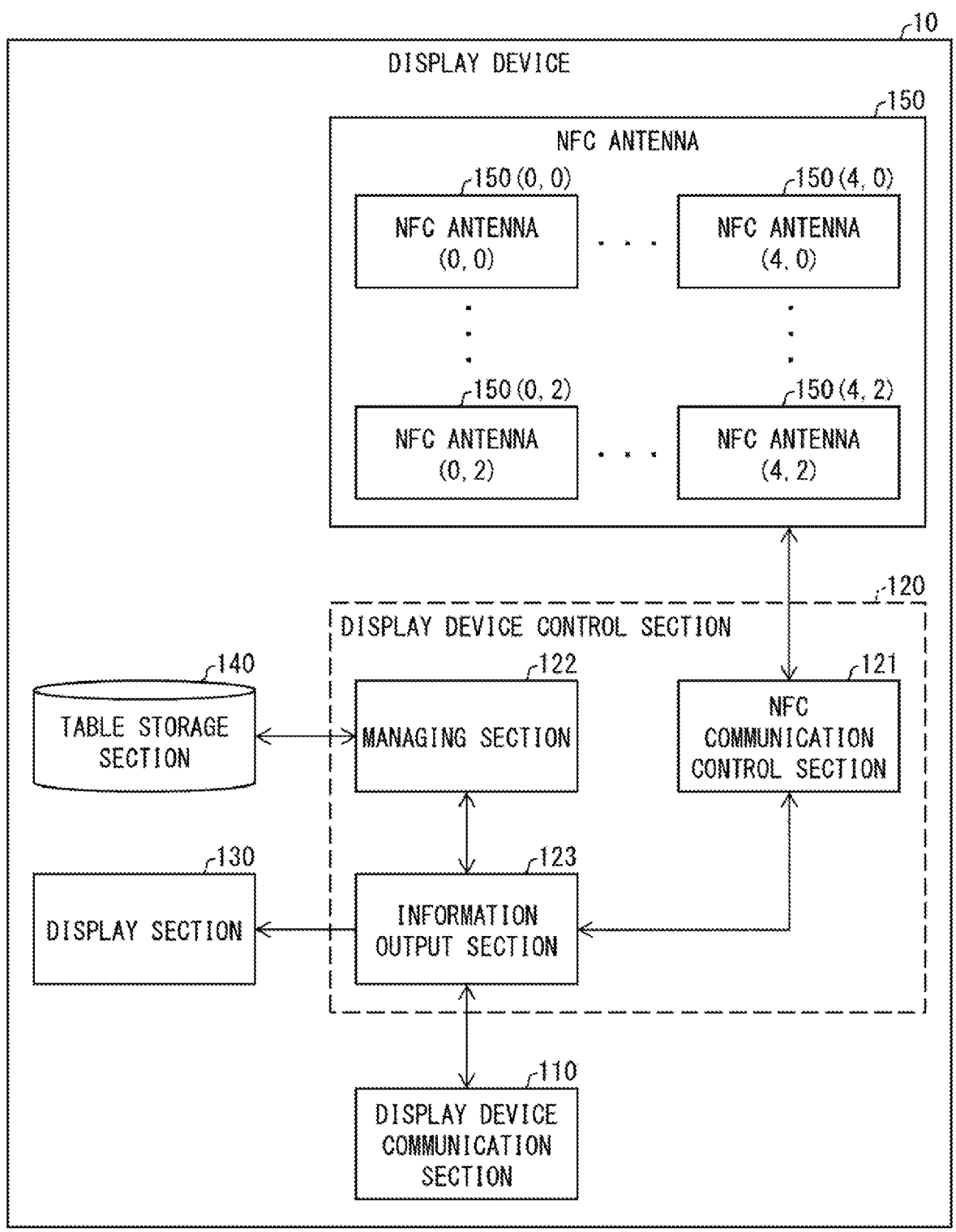
FIG. 2 is a block diagram illustrating main components of a display device in accordance with Embodiment 1 of the present invention.

FIG. 2 is a block diagram illustrating main components of the display device 10 in accordance with Embodiment 1 of the present invention. The display device 10 will be described below with reference to FIG. 2.

As illustrated in FIG. 2, the display device 10 includes a display device communication section 110, a display device control section 120, a display section 130, a table storage section 140, and NFC antennas 150.

The display device communication section 110 can send and receive information to/from an external device. The display device communication section 110 is achieved by, for example, (i) a LAN terminal to which a LAN cable is to be connected or (ii) a wireless LAN interface.

The display section 130 displays an image based on an image signal outputted from the display device control section 120. The display section 130 is achieved by, for example, (i) a transmissive liquid crystal panel including a backlight or (ii) an organic EL (Electro luminescence) display.

The table storage section 140 stores an information management table in which antenna identification information and object location information are associated with each other. The antenna identification information is associated with each of the NFC antennas. The object location information indicates a location of an object relative to a display content which is displayed by the display device 10 and which includes the object. The table storage section 140 is achieved by a hard disk drive (HDD). Embodiment 1 and in Embodiments 2 through 5 described later discuss examples in which antenna identification information is antenna location information indicative of a location of each of the NFC antennas 150 relative to the display device 10. The information management table will be described later in detail with reference to another drawing.

The NFC antennas 150 carry out NFC communication with the mobile terminal 20 (more specifically, with an NFC-I/F section 250 of the mobile terminal 20 described later). As illustrated in FIG. 2, the NFC antennas 150 includes a plurality of NFC antennas (an NFC antenna 150(0,0), an NFC antenna 150(4,2), and the like). As illustrated in FIG. 2, a location of each of the NFC antennas 150 can be identified by coordinates such as (0,0) and (1,0). In other words, antenna location information can be described as information that shows coordinates of each of the NFC antennas 150.

The display device control section 120 centrally controls the components of the display device 10, and is achieved by a CPU (Central Processing Unit). The display device control section 120 will be described below in detail.

(Display Device Control Section 120)

As illustrated in FIG. 2, the display device control section 120 also functions as (i) an NFC communication control section (proximity information obtaining section, terminal operation information obtaining section) 121, (ii) a managing section 122, and (iii) an information output section (terminal operation information obtaining section) 123.

The NFC communication control section 121 controls NFC communication via the NFC antennas 150.

The managing section 122 manages the information management table stored in the table storage section 140. A process which the managing section 122 carries out to manage the information management table will be described later in detail with reference to another drawing.

In a case where the information output section 123 obtains information, the information output section 123 carries out at least one of the following processes, depending on the information: (1) supplies the information to an external device via the display device communication section 110, (2) supplies the information to the display section 130, (3) supplies the information to the NFC communication control section 121, and (4) supplies the information to the managing section 122.

(Mobile Terminal 20)

Figure 3:
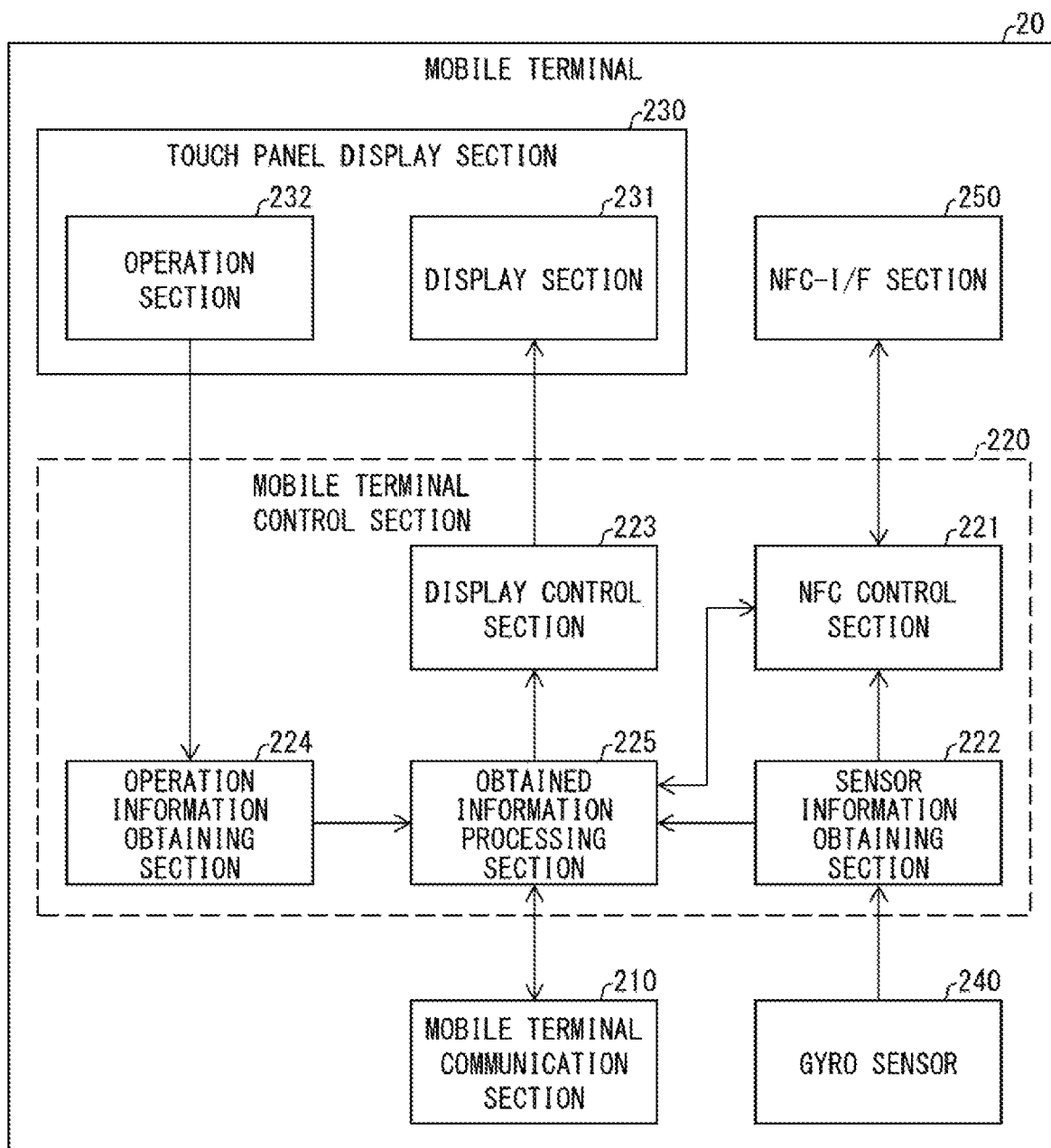
FIG. 3 is a block diagram illustrating main components of a mobile terminal in accordance with Embodiment 1 of the present invention.

FIG. 3 is a block diagram illustrating main components of the mobile terminal 20 in accordance with Embodiment 1 of the present invention. The mobile terminal 20 will be described below with reference to FIG. 3.

As illustrated in FIG. 3, the mobile terminal 20 includes a mobile terminal communication section 210, a mobile terminal control section 220, a touch panel display section 230, a gyro sensor 240, and the NFC-I/F section 250.

The mobile terminal communication section 210 can send and receive information to/from an external device.

The gyro sensor 240 detects a movement of the mobile terminal 20 and then outputs sensor information indicative of the movement.

The NFC-I/F section 250 carries out NFC communication with the display device 10 (specifically, the NFC antennas 150 of the display device 10).

As illustrated in FIG. 3, the touch panel display section 230 includes a display section 231 and an operation section 232.

The display section 231 displays an image based on an image signal which has been supplied from the mobile terminal control section 220. The display section 231 is achieved by, for example, (i) a transmissive liquid crystal panel including a backlight or (ii) an organic EL display.

The operation section 232 receives an operation of a user, and then supplied operation information indicative of the operation. The operation section 232 is achieved by a touch sensor that detects that an object has come into contact with the operation section 232.

The mobile terminal control section 220 centrally controls the components of the mobile terminal 20, and is achieved by a CPU. The mobile terminal control section 220 will be described below in detail.

(Mobile Terminal Control Section 220)

As illustrated in FIG. 3, the mobile terminal control section 220 also functions as (i) an NFC control section 221, (ii) a sensor information obtaining section 222, (iii) a display control section 223, (iv) an operation information obtaining section 224, and (v) an obtained information processing section (relevant information processing section, relevant information obtaining section) 225.

The NFC control section 221 controls NFC communication which is carried out by the NFC-I/F section 250.

The sensor information obtaining section 222 obtains sensor information which has been supplied from the gyro sensor 240.

The display control section 223 outputs an image signal to be displayed on the display section 231.

The operation information obtaining section 224 obtains operation information which has been supplied from the operation section 232.

The obtained information processing section 225 carries out a process according to information obtained. In Embodiment 1, the obtained information processing section 225 supplies, to the display control section 223, information which has been obtained.

(Flow of Process Carried Out by Display Device 10)

Figure 4:
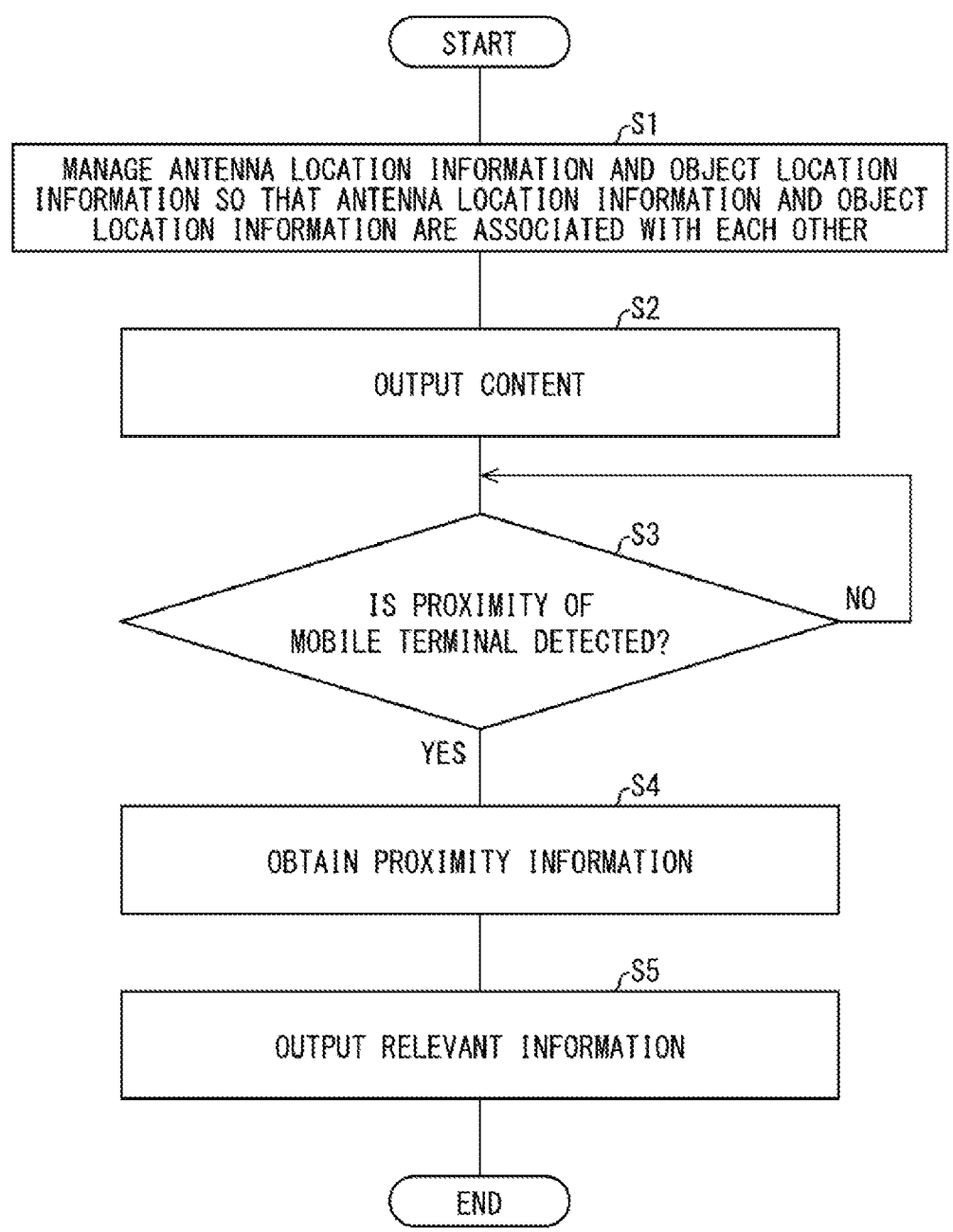
FIG. 4 is a flow chart illustrating a flow of a process carried out by the display device in accordance with Embodiment 1 of the present invention.

FIG. 4 is a flow chart illustrating a flow of a process carried out by the display device 10 in accordance with Embodiment 1 of the present invention. The following description will discuss, with reference to FIG. 4, a flow of a process (i.e. a method of controlling an information output system) which is carried out by the display device 10.

(Step S1, Managing Step)

First, the information output section 123 supplies, to the managing section 122, a display content which is to be supplied to the display section 130. The managing section 122 manages, for the NFC antennas 150 (antennas), respective pieces of antenna location information and respective pieces of object location information on objects which are contained in an obtained display content so that the pieces of antenna location information and the pieces of object location information are associated with each other. Here, the following describes, with reference to FIGS. 5 and 6, a method of managing the pieces of antenna location information and the pieces of object location information by the managing section 122 so that the pieces of antenna location information and the pieces of object location information are associated with each other.

(Information Management Table)

Figure 5:
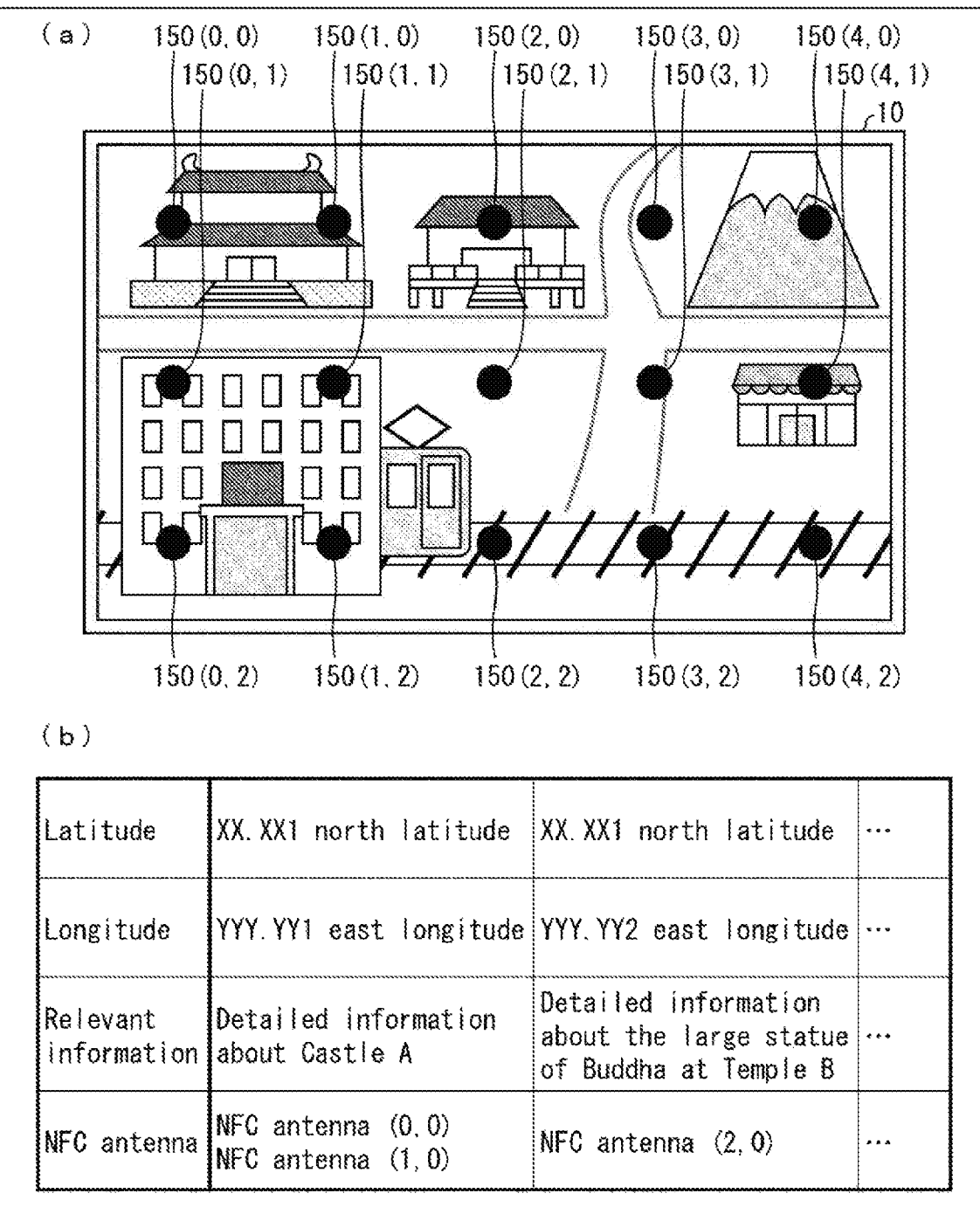
FIG. 5 is a view showing examples of a display content in Embodiment 1 of the present invention and of an information management table managed by a managing section in Embodiment 1 of the present invention.

FIG. 5 is a view illustrating an example of a display content and an information management table which is managed by the managing section 122, in accordance with Embodiment 1 of the present invention. (a) of FIG. 5 illustrates an example of a display content, and (b) of FIG. 5 illustrates an information management table which is managed by the managing section 122 in a case where the display device 10 displays the display content illustrated in (a) of FIG. 5.

In a case where the managing section 122 has obtained the display content illustrated in (a) of FIG. 5 from the information output section 123, the managing section 122 causes pieces of antenna location information and latitudes and longitudes (pieces of object location information) of objects (such as a castle, a temple, and a mountain in (a) of FIG. 5) to be stored in the information management table so that the pieces of antenna location information and the latitudes and longitudes are associated with each other.

For example, in (a) of FIG. 5, a castle which exists at XX.XX1 north latitude and YYY.YY1 east longitude is displayed while overlapping with the NFC antenna 150(0,0). In this case, the managing section 122 causes NFC antenna (0,0), XX.XX1 north latitude, and YYY.YY1 east longitude to be stored in the information management table so that NFC antenna (0,0), XX.XX1 north latitude, and YYY.YY1 east longitude are associated with each other (see (b) of FIG. 5). Moreover, as illustrated in (a) of FIG. 5, the castle existing at XX.XX1 north latitude and YYY.YY1 east longitude is displayed while overlapping with also the NFC antenna 150(1,0). Therefore, the managing section 122 causes NFC antenna (1,0), XX.XX1 north latitude, and YYY.YY1 east longitude to be stored in the information management table so that NFC antenna (1,0) is also associated with XX.XX1 north latitude and YYY.YY1 east longitude (see (b) of FIG. 5). Note that, in the descriptions below, the state of being displayed while overlapping with the NFC antenna 150 is sometimes simply expressed as being "displayed on the NFC antenna 150".

Moreover, for example, in (a) of FIG. 5, a temple existing at XX.XX1 north latitude and YYY.YY2 east longitude is displayed on the NFC antenna 150(2,0). In this case, the managing section 122 causes NFC antenna (2,0), XX.XX1 north latitude, and YYY.YY2 east longitude to be stored in the information management table so that NFC antenna (2,0), XX.XX1 north latitude, and YYY.YY2 east longitude are associated with each other (see (b) of FIG. 5).

As illustrated in (b) of FIG. 5, the managing section 122 can cause pieces of relevant information, which are associated with latitudes and longitudes of objects, to be stored in the information management table in addition to the pieces of antenna location information and the latitudes and longitudes of the objects. In this specification, relevant information which is associated with a latitude and a longitude which are associated with antenna location information is sometimes simply expressed as "relevant information associated with the NFC antenna 150". Note that the managing section 122 can be configured to cause relevant information to be stored in the information management table for each output destination. For example, the managing section 122 can be configured to cause relevant information A, which is to be supplied to the mobile terminal, and relevant information B, which is to be supplied to the display section 130, to be stored in the information management table.

Figure 6:
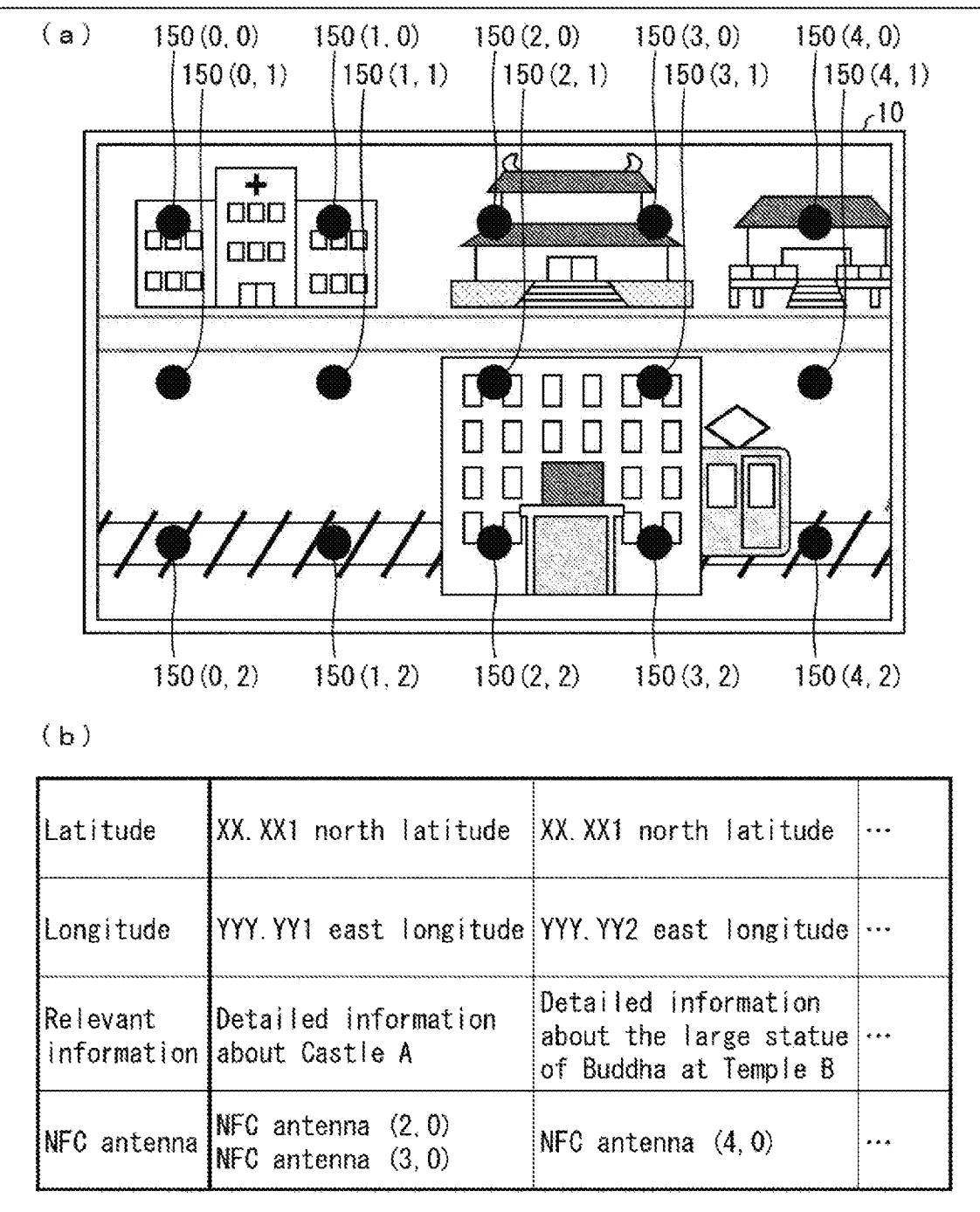
FIG. 6 is a view showing other examples of the display content in Embodiment 1 of the present invention and of the information management table managed by the managing section in Embodiment 1 of the present invention.

Next, the following description will discuss, with reference to FIG. 6, a case where a display content displayed on the display device 10 is changed from the display content that is illustrated in (a) of FIG. 5 to a display content that is displayed by scrolling (translation) in a rightward direction. Here, the phrase "scrolling in a rightward direction" means to carry out scrolling such that a peripheral content on a left side of the display content is newly displayed.

FIG. 6 is a view illustrating another example of a display content and an information management table which is managed by the managing section 122, in accordance with Embodiment 1 of the present invention. (a) of FIG. 6 illustrates another example of a display content, and (b) of FIG. 6 illustrates an information management table which is managed by the managing section 122 in a case where the display device 10 displays the display content illustrated in (a) of FIG. 6.

In a case where the managing section 122 has obtained the display content illustrated in (a) of FIG. 6 from the information output section 123, the managing section 122 causes pieces of antenna location information and latitudes and longitudes of objects contained in the display content to be stored in the information management table, as with the manner described above, so that the pieces of antenna location information and the latitudes and longitudes are associated with each other.

For example, in (a) of FIG. 6, a castle existing at XX.XX1 north latitude and YYY.YY1 east longitude is displayed on the NFC antenna 150(2,0). In this case, the managing section 122 causes NFC antenna (2,0), XX.XX1 north latitude, and YYY.YY1 east longitude to be stored in the information management table so that NFC antenna (2,0), XX.XX1 north latitude, and YYY.YY1 east longitude are associated with each other (see (b) of FIG. 6). Moreover, as illustrated in (a) of FIG. 6, the castle existing at XX.XX1 north latitude and YYY.YY1 east longitude is also displayed on the NFC antenna 150(3,0). Therefore, the managing section 122 causes NFC antenna (3,0), XX.XX1 north latitude, and YYY.YY1 east longitude to be stored in the information management table so that NFC antenna (3,0) is also associated with XX.XX1 north latitude and YYY.YY1 east longitude (see (b) of FIG. 6).

Moreover, for example, in (a) of FIG. 6, a temple existing at XX.XX1 north latitude and YYY.YY2 east longitude is displayed on the NFC antenna 150(4,0). In this case, the managing section 122 causes NFC antenna (4,0), XX.XX1 north latitude, and YYY.YY2 east longitude to be stored in the information management table so that NFC antenna (4,0), XX.XX1 north latitude, and YYY.YY2 east longitude are associated with each other (see (b) of FIG. 6).

As such, in a case where the managing section 122 has obtained a display content, the managing section 122 manages antenna location information and object location information of an object, which is displayed on the NFC antenna 150 at coordinates indicated by the antenna location information, so that the antenna location information and the object location information are associated with each other. Therefore, even in a case where the display device 10 changes a display content to be displayed, it is possible to associate object location information of the display content, which is newly displayed, with NFC antennas 150.

Note that the managing section 122 is preferably configured to manage antenna location information and object location information so that the antenna location information is associated with the object location information which is of an object that is displayed within a certain range based on an NFC antenna 150 whose location is identified by the antenna location information. The certain range can be, for example, a certain range which is based on a certain NFC antenna 150 and in which a distance from the certain NFC antenna 150 to a certain point on the display screen of the display device 10 is shorter than those of the other NFC antennas 150. Alternatively, it is possible to employ a configuration in which a plurality of regions (e.g. a plurality of regions on a rectangle) are defined in the display screen of the display device 10 in advance, one (1) NFC antenna 150 is provided within each of the plurality of regions, and the plurality of regions are set as respective certain ranges for the NFC antennas 150.

(Step S2)

Next, the information output section 123 supplies, to the display section 130, an image signal which indicates a display content. The display section 130 displays the display content that is indicated by the image signal which has been obtained.

(Step S3, Proximity Information Obtaining Step)

The NFC communication control section 121 determines whether or not proximity of the mobile terminal 20 has been detected via an NFC antenna 150. In other words, the NFC communication control section 121 determines whether or not any of the plurality of NFC antennas 150 has carried out short range communication with the NFC-I/F section 250 of the mobile terminal 20.

(Step S4) In the step S3, in a case where the NFC communication control section 121 has determined that "an NFC antenna 150 had detected proximity of the mobile terminal 20" (step S3: YES), the NFC communication control section 121 obtains proximity information indicative of the NFC antenna that has detected proximity of the mobile terminal 20 among the plurality of NFC antennas 150, and supplies the proximity information to the information output section 123.

Here, the NFC communication control section 121 can be configured to obtain, as the proximity information, antenna identification information which is associated with the NFC antenna that has detected proximity of the mobile terminal 20 among the plurality of NFC antennas 150. Specifically, the NFC communication control section 121 can be configured to obtain, as proximity information, coordinates of the NFC antenna 150 which has carried out short range communication with the NFC-I/F section 250 of the mobile terminal 20.

(Step S5, Outputting Step)

The information output section 123 supplies, to the managing section 122, the proximity information which has been obtained. The managing section 122 obtains relevant information, which is associated with coordinates of the NFC antenna 150 that is indicated by the obtained proximity information, from the information management table stored in the table storage section 140 and then supplies the relevant information to the information output section 123.

The information output section 123 outputs the relevant information thus obtained.

Example 1 of Relevant Information

Figure 7:
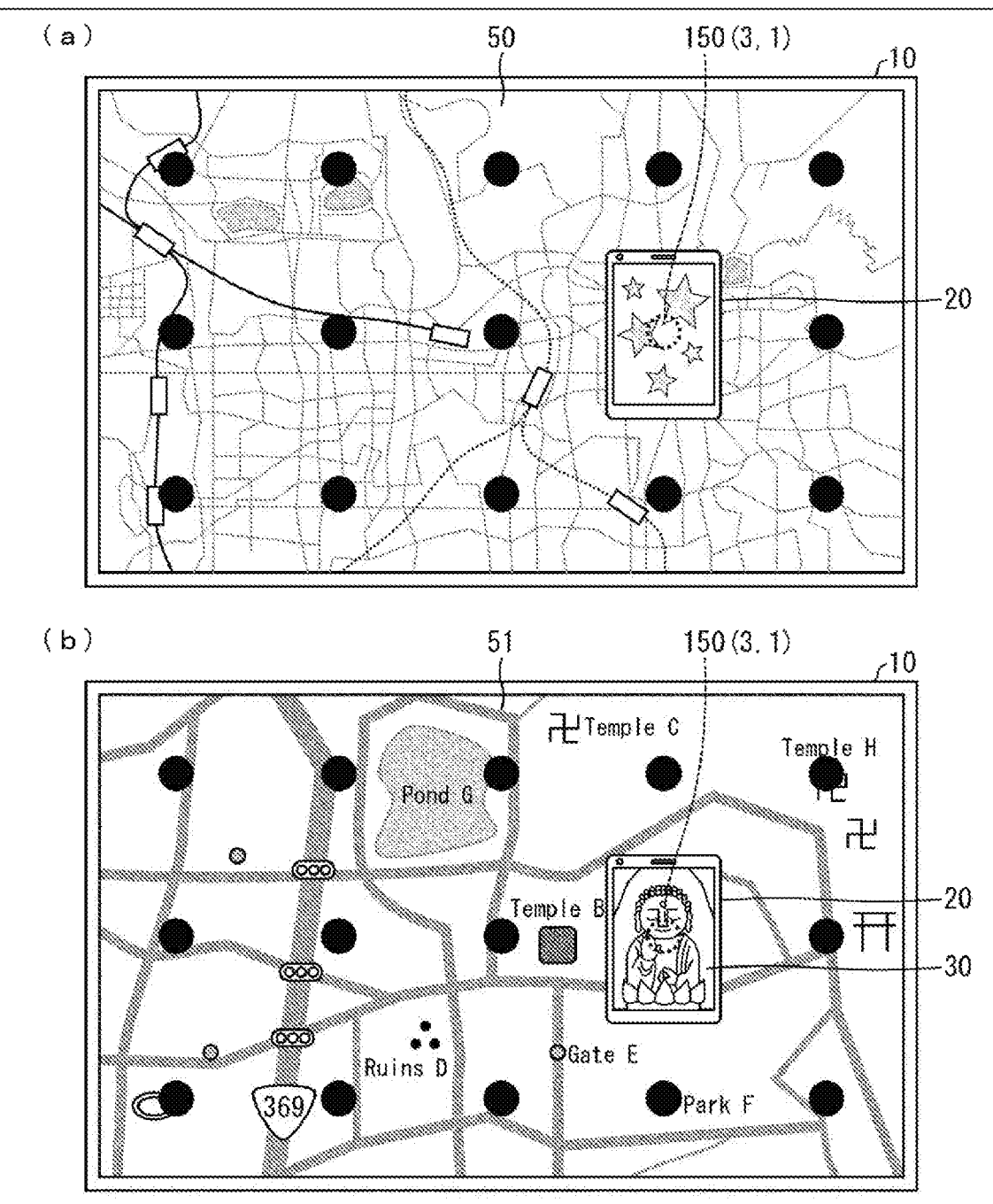
FIG. 7 is a view showing examples of images displayed in the content display system in accordance with Embodiment 1 of the present invention.

The following description will discuss, with reference to FIG. 7, an example of relevant information that is outputted by the display device 10. FIG. 7 is a view showing examples of images displayed in the content display system 1 in accordance with Embodiment 1 of the present invention. (a) of FIG. 7 is a view illustrating a state in which the mobile terminal 20 has come into proximity to the display device 10, and (b) of FIG. 7 is a view illustrating a state in which relevant information is displayed.

First, as illustrated in (a) of FIG. 7, the display device 10 displays a map 50 which is a display content. In the map 50, Temple B which is famous for a large statue of Buddha is displayed on the NFC antenna 150(3,1). The NFC antenna 150(3,1) is associated with a latitude and a longitude of Temple B as object location information. The object location information is associated with the following pieces of relevant information:

An image of the large statue of Buddha at Temple B, as relevant information A that is supplied to the mobile terminal A map enlarged on the basis of a location of Temple B, as relevant information B that is supplied to the display section 130

In this state, as illustrated in (a) of FIG. 7, in a case where the user has brought the mobile terminal 20 into proximity to the NFC antenna 150(3,1), the NFC-I/F section 250 of the mobile terminal 20 and the NFC antenna 150(3,1) carry out short range communication. Then, the display device 10 outputs, as follows, relevant information which is associated with the NFC antenna 150(3,1).

The information output section 123 of the display device 10 supplies the image of the large statue of Buddha at Temple B, which image is the relevant information A, to the NFC communication control section 121. The NFC communication control section 121 supplies the relevant information A thus obtained to the mobile terminal 20 via the NFC antenna 150(3,1). The NFC control section 221 of the mobile terminal 20 obtains the relevant information A via the NFC-I/F section 250 and supplies the relevant information A to the obtained information processing section 225. The obtained information processing section 225 supplies, to the display control section 223, relevant information A which has been obtained. The display control section 223 supplies, to the display section 231, an image signal indicative of the image of the large statue of Buddha at Temple B which image is obtained relevant information. The display section 231 displays an image 30 of the large statue of Buddha at Temple B, which image 30 is indicated by the image signal that has been obtained (see (b) of FIG. 7). Note that, in the descriptions below, a process in which the display device 10 supplies relevant information to the mobile terminal 20 via the NFC antenna 150, the mobile terminal 20 obtains the relevant information via the NFC-I/F section 250, and the display section 231 displays the relevant information is sometimes simply expressed as follows: that is "the display device 10 supplies relevant information to the mobile terminal 20 via the NFC antenna 150, and the mobile terminal 20 displays the relevant information".

Further, the information output section 123 of the display device 10 supplies, to the display section 130, an image signal indicative of the map enlarged on the basis of the location of Temple B, which map is the relevant information B. The display section 130 displays a map 51 which has been enlarged on the basis of the location of Temple B (see (b) of FIG. 7). Note that, as above described, the information output section 123 of the display device 10 only needs to be configured to output at least one of the relevant information A and the relevant information B, and this configuration applies to the other embodiments.

Note that, in a case where the user has brought the mobile terminal 20 away from the display device 10 in the state illustrated in (b) of FIG. 7 (in other words, in a case where short range communication between the NFC-I/F section 250 of the mobile terminal 20 and the NFC antenna 150(3,1) has been disconnected), the display device 10 can keep displaying the map 51 illustrated in (b) of FIG. 7 or can display the map 50 illustrated in (a) of FIG. 7 again. Moreover, in this case, the mobile terminal 20 also can keep displaying the image 30 illustrated in (b) of FIG. 7 or can display an initial screen illustrated in (a) of FIG. 7.

Instead of the enlarged map, the display device 10 can display, as relevant information, the map which has been obtained by subjecting the map displayed by the display device 10 to, as another example, translation (scrolling), rotation, shrinkage, and a combination of these. For example, in (a) of FIG. 7, in a case where the NFC antenna 150(3,1) and the mobile terminal 20 have carried out short range communication, it is possible that the map which has been scrolled so that the center of the map 50 overlaps with the NFC antenna 150(3,1) is outputted as relevant information. Alternatively, for example, in (a) of FIG. 7, in a case where the NFC antenna 150(3,1) and the mobile terminal 20 have carried out short range communication, it is possible to output, as relevant information, the map which has been rotated 90 degrees clockwise around a point identified by a latitude and a longitude which are associated with the NFC antenna 150(3,1).

The information output section 123 can be configured to supply the relevant information A to the mobile terminal 20 via the display device communication section 110. Specifically, the information output section 123 outputs the image of the large statue of Buddha at Temple B, which image is the relevant information A, via the display device communication section 110. The obtained information processing section 225 of the mobile terminal 20 obtains the relevant information A via the mobile terminal communication section 210, and supplies the relevant information A to the display control section 223. The display control section 223 supplies, to the display section 231, an image signal indicative of the image of the large statue of Buddha at Temple B which image is obtained relevant information. Note that, in the descriptions below, a process in which the display device 10 supplies relevant information to the mobile terminal 20 via the display device communication section 110, the mobile terminal 20 obtains the relevant information via the mobile terminal communication section 210, and the display section 231 displays the relevant information is sometimes simply expressed as follows: that is "the display device 10 supplies relevant information to the mobile terminal 20 via the display device communication section 110, and the mobile terminal 20 displays the relevant information". In the embodiments described below also, it is possible to employ the configuration in which the display device 10 supplies relevant information to the mobile terminal 20 via the display device communication section 110.

Example 2 of Relevant Information

Figure 8:
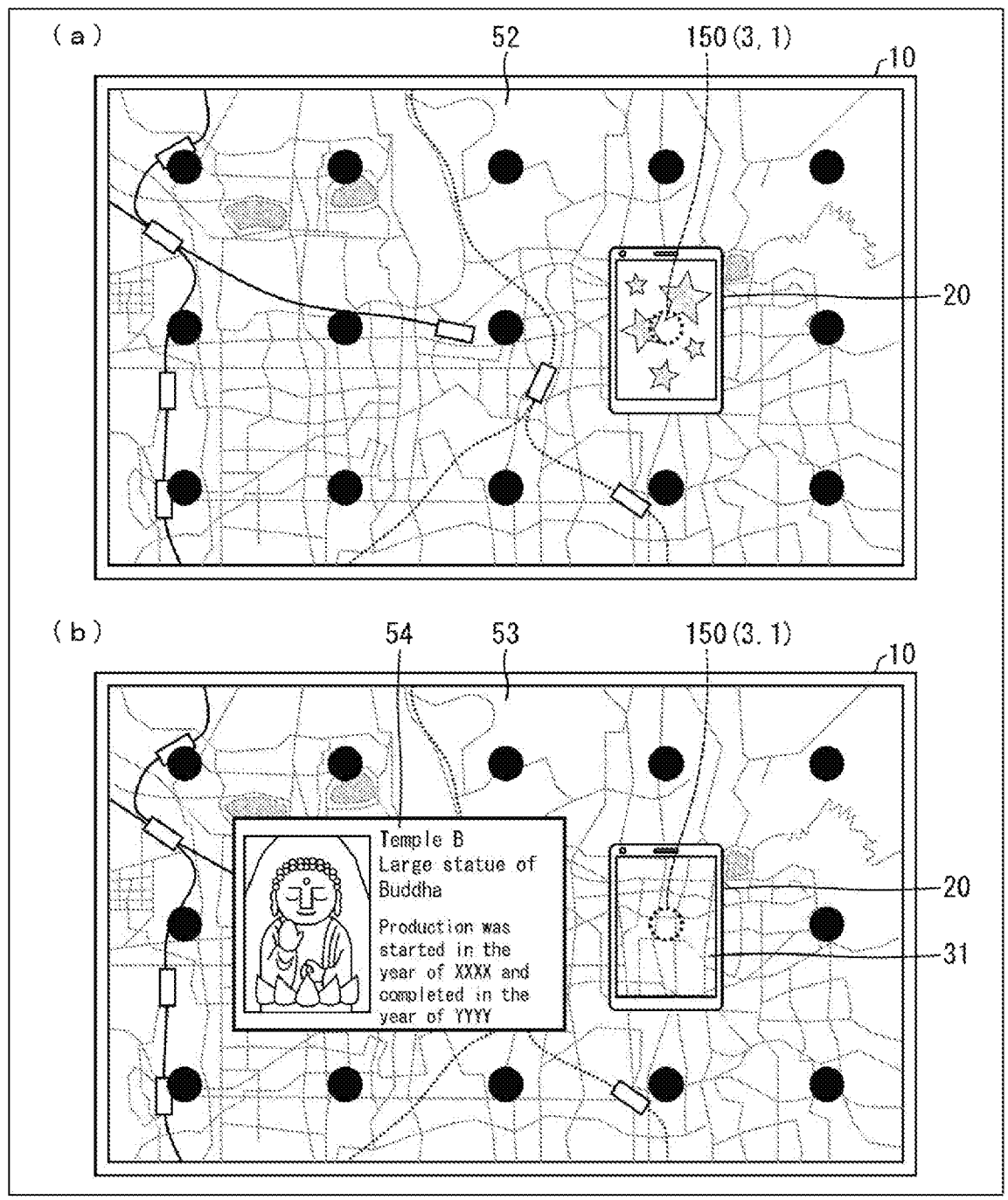
FIG. 8 is a view showing other examples of images displayed in the content display system in accordance with Embodiment 1 of the present invention.

The following description will discuss, with reference to FIG. 8, another example of relevant information that is outputted by the display device 10. FIG. 8 is a view showing other examples of images displayed in the content display system 1 in accordance with Embodiment 1 of the present invention. (a) of FIG. 8 is a view illustrating a state in which the mobile terminal 20 has come into proximity to the display device 10, and (b) of FIG. 8 is a view illustrating a state in which relevant information is displayed.

First, as illustrated in (a) of FIG. 8, the display device 10 displays a map 52 which is a display content. In the map 52, Temple B which is famous for a large statue of Buddha is displayed on the NFC antenna 150(3,1). The NFC antenna 150(3,1) is associated with a latitude and a longitude of Temple B as object location information. The object location information is associated with the following pieces of relevant information:

A map whose center is at the location of Temple B, as relevant information A that is supplied to the mobile terminal An image of the large statue of Buddha at Temple B and a text image indicative of details of the large statue of Buddha, as relevant information B that is supplied to the display section 130

In this state, in a case where the user has brought the mobile terminal 20 into proximity to the NFC antenna 150(3,1), the NFC-I/F section 250 of the mobile terminal 20 and the NFC antenna 150(3,1) carry out short range communication. Then, the display device 10 outputs, as follows, relevant information which is associated with the NFC antenna 150(3,1).

The display device 10 supplies the map, which is the relevant information A and whose center is the location of Temple B, to the mobile terminal 20 via the NFC antenna 150(3,1). The mobile terminal 20 displays a map 31 which has been obtained and whose center is the location of Temple B (see (b) of FIG. 8).

Moreover, the display device 10 supplies, to the display section 130, an image of the large statue of Buddha at Temple B and a text image indicative of details of the large statue of Buddha which images are the relevant information B. The display section 130 displays a map 53 with which the image of the large statue of Buddha at Temple B and a text image 54 indicative of details of the large statue of Buddha are overlapping (see (b) of FIG. 8).

As such, in the content display system 1 in accordance with Embodiment 1, the display device 10 manages (i) pieces of antenna location information (i.e. coordinates of the NFC antennas 150) indicative of locations of the respective NFC antennas 150 in the display device 10 and (ii) pieces of object location information of objects which are displayed on the display device 10 within certain ranges which are based on respective NFC antennas (i.e. on the respective NFC antennas) among pieces of object location information (latitudes and longitudes) indicative of respective locations of objects (such as Temple B) in a content (such as a map). Here, the pieces of antenna location information and the pieces of object location information which are managed by the display device 10 are associated with each other. In a case where the display device 10 has obtained proximity information (i.e. coordinates) of an NFC antenna 150 among the NFC antennas 150 to which the mobile terminal 20 has come into proximity, the display device 10 outputs relevant information (such as an image of Temple B) that is associated with object location information of an object displayed in a certain range which is based on an NFC antenna indicated by the proximity information.

According to the configuration, in the content display system 1, even in a case where an object to be displayed is changed, object location information of the object which is newly displayed is associated with antenna location information. Further, relevant information which is associated with the object location information which has been changed is outputted, and therefore the display device 10 can output information that is relevant to the object. Moreover, the relevant information which is outputted is relevant information associated with an NFC antenna 150 to which the mobile terminal 20 has come into proximity, and this allows the user to obtain the relevant information by bringing the mobile terminal 20 into proximity to the object. Therefore, in the content display system 1, it is possible to output information, which is relevant to an object displayed on the display device 10, with a simple operation for the user.

Moreover, in the content display system 1, the display device 10 can change IDs which are assigned to the respective NFC antennas 150. This makes it possible to prevent a case in which the mobile terminal 20, which has obtained an ID of an NFC antenna 150 through short range communication with the NFC antenna 150, uses the ID without authorization (e.g. remotely operates the display device 10).

Embodiment 2

Figure 9:
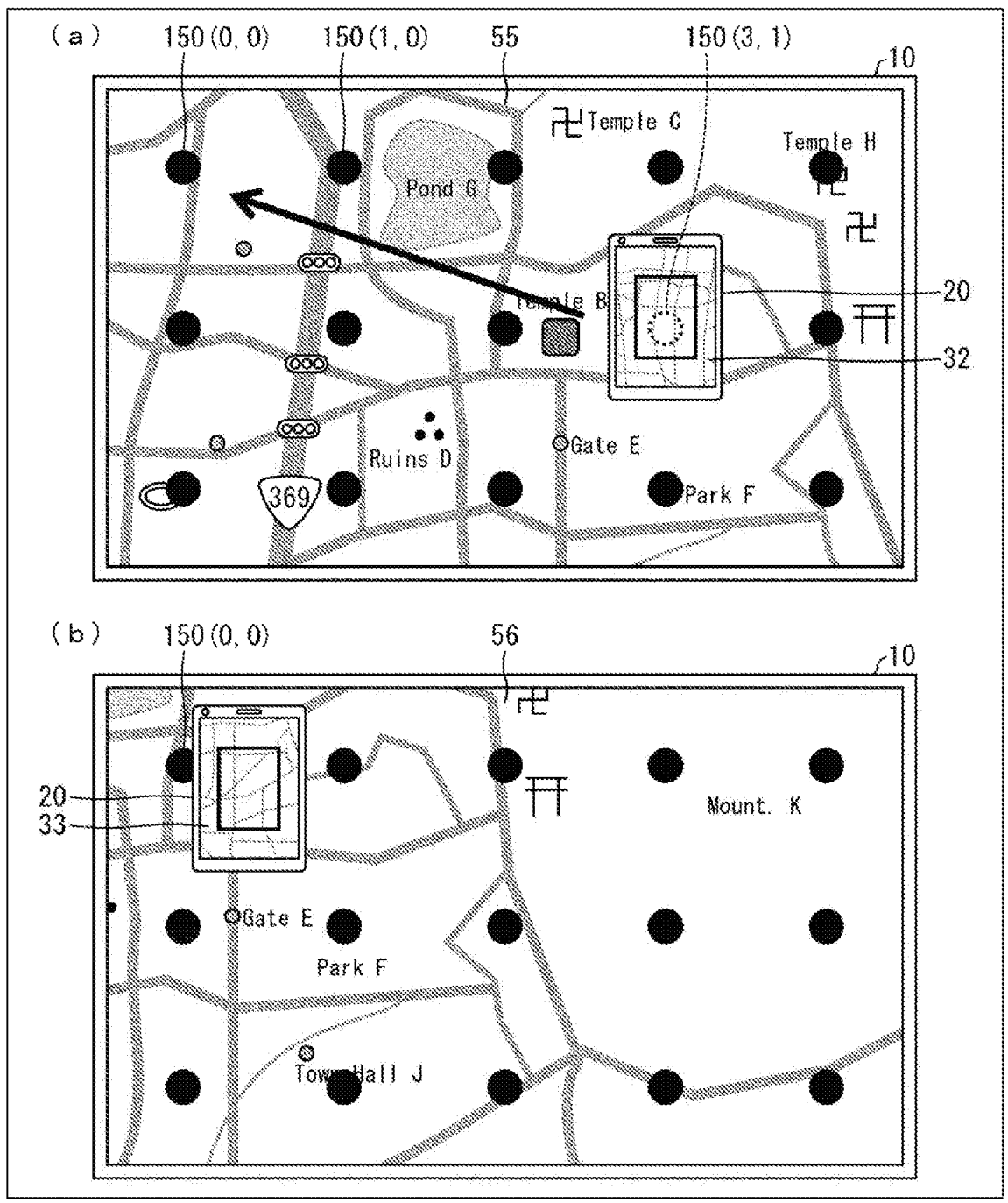
FIG. 9 is a view showing examples of images displayed in a content display system in accordance with Embodiment 2 of the present invention.

The following description will discuss another embodiment of the present invention with reference to FIG. 9. The display device 10 can be configured as follows, that is, the display device 10 detects proximity of the mobile terminal 20 and outputs relevant information, and then changes the relevant information in accordance with proximity information which has been further obtained. In Embodiment 2, this configuration is described.

FIG. 9 is a view showing examples of images displayed in the content display system 1 in accordance with Embodiment 2 of the present invention. (a) of FIG. 9 is a view illustrating a state in which the mobile terminal 20 which has come into proximity to the display device 10 is moved by the user, and (b) of FIG. 9 is a view illustrating a state in which an image based on relevant information is displayed. In a case where the information output section 123 has obtained proximity information A, outputted a map as relevant information, and further obtained proximity information B, the information output section 123 outputs, as relevant information, a map obtained by carrying out a scrolling (translation) process with respect to the outputted map so that an object which has been displayed on an NFC antenna 150 indicated by the proximity information A is displayed on an NFC antenna 150 indicated by the proximity information B.

As illustrated in (a) of FIG. 9, the mobile terminal 20 is in proximity to the NFC antenna 150(3,1), and therefore the display device 10 displays a map 55 which is relevant information. Moreover, the mobile terminal 20 displays a map 32 which is relevant information. Note that the map 32 which is displayed on the mobile terminal 20 is a shrunk map (shrunk content) which is obtained by shrinking a map that includes the map 55 which is a display content (display target content) and a peripheral map (peripheral content) around the map 55. The information output section 123 outputs a frame which indicates a range of the map 55 in the shrunk map so that the map 55 and the peripheral map can be distinguished from each other in the shrunk map. Note that an aspect for the distinction is not limited to the frame and can be a difference in color, difference in brightness, a combination of these, or the like.

In this state, the mobile terminal 20 is moved as indicated by the arrow in (a) of FIG. 9. In this case, the mobile terminal 20 carries out short range communication with the NFC antenna 150(3,1), the NFC antenna 150(2,1), the NFC antenna 150(1,0), and the NFC antenna 150(0,0) in this order.

Then, in a case where the mobile terminal 20 has carried out short range communication with the NFC antenna 150 (0,0) for a certain time period (e.g. 1 second) at a location illustrated in (b) of FIG. 9, the NFC communication control section 121 supplies, to the information output section 123, proximity information which indicates the NFC antenna 150(0,0). In a case where the information output section 123 has obtained the proximity information, the information output section 123 outputs relevant information which corresponds to the proximity information thus obtained. Specifically, the information output section 123 changes the map 55, which is the outputted relevant information, into a map obtained by carrying out a scrolling process such that an object displayed on the NFC antenna (3,1) is displayed on the NFC antenna (0,0). Then, the information output section 123 supplies, to the display section 130, an image signal which indicates the map thus changed. As illustrated in (b) of FIG. 9, the display section 130 displays a map 56 obtained by scrolling the map illustrated in (a) of FIG. 9.

Further, the information output section 123 similarly changes the map 32 which has been supplied to the mobile terminal 20 and outputs, as relevant information, a map thus changed. In a case where the mobile terminal 20 has obtained the relevant information, the mobile terminal 20 displays a map 33 thus changed (see (b) of FIG. 9).

As such, in the content display system 1 in accordance with Embodiment 2, the display device 10 detects proximity of the mobile terminal 20 and outputs relevant information, and then changes the relevant information in accordance with proximity information which has been further obtained. Therefore, the display device 10 can display a content which corresponds to change in location of the mobile terminal 20 which has come into proximity to the display device 10.

Embodiment 3

Figure 10:
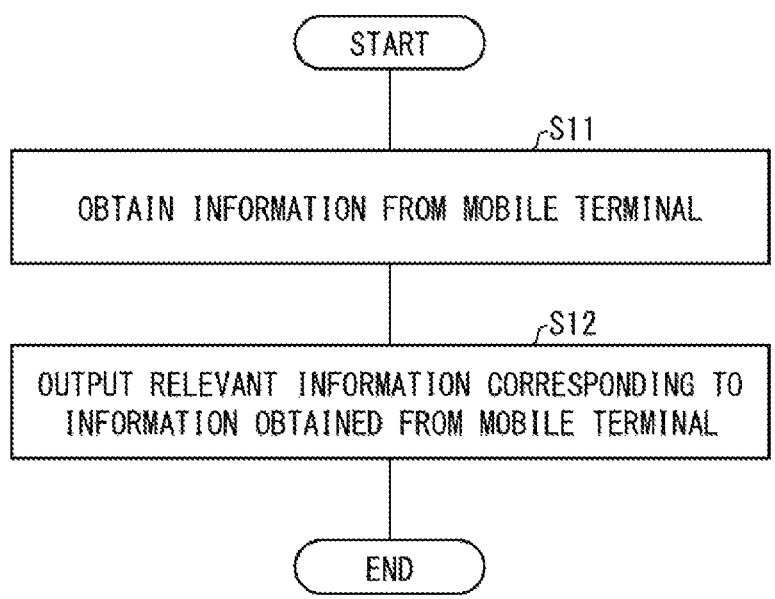
FIG. 10 is a flow chart illustrating a flow of a process carried out by a display device in accordance with Embodiment 3 of the present invention.
Figure 11:
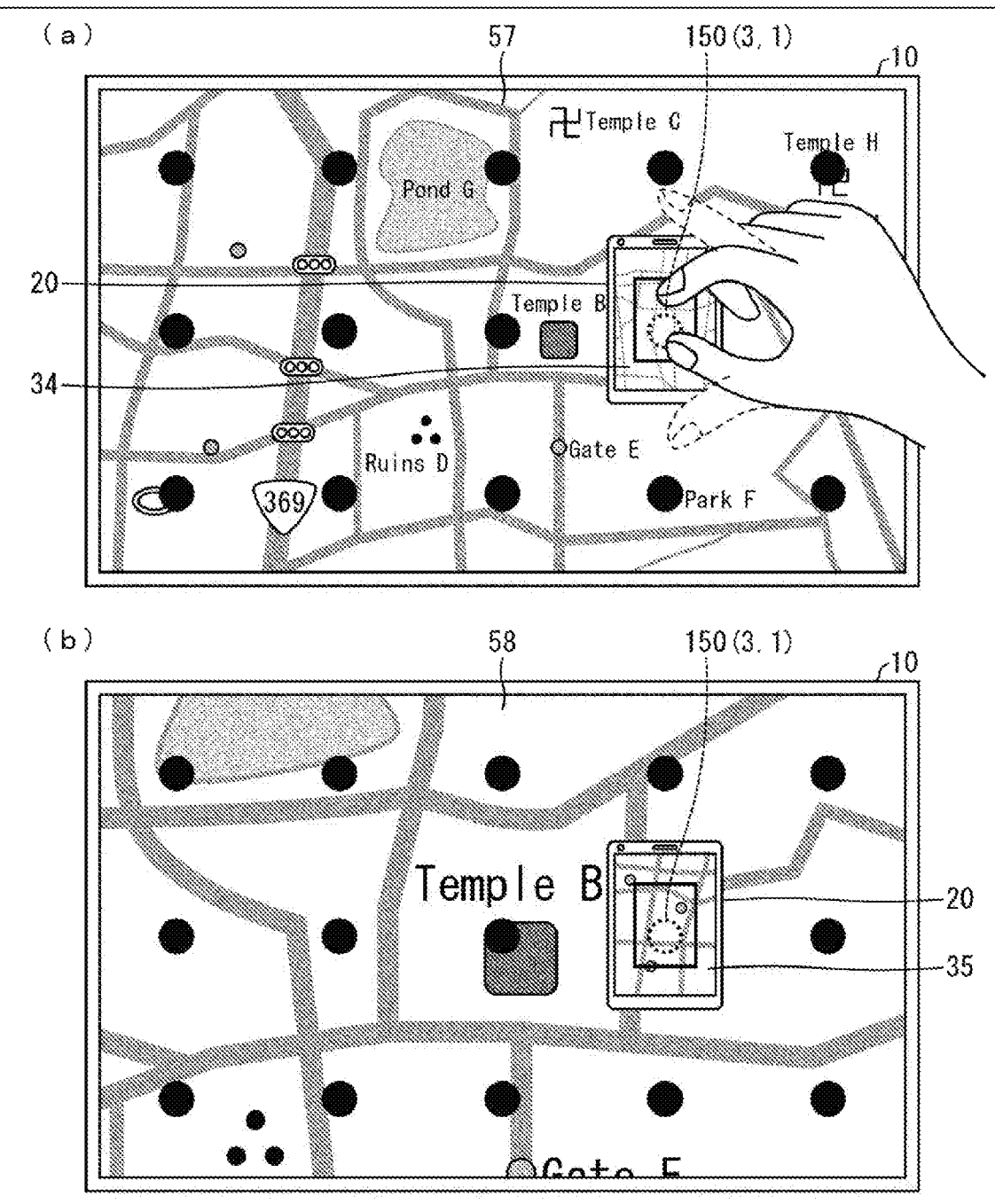
FIG. 11 is a view showing examples of images displayed in a content display system in accordance with Embodiment 3 of the present invention.
Figure 12:
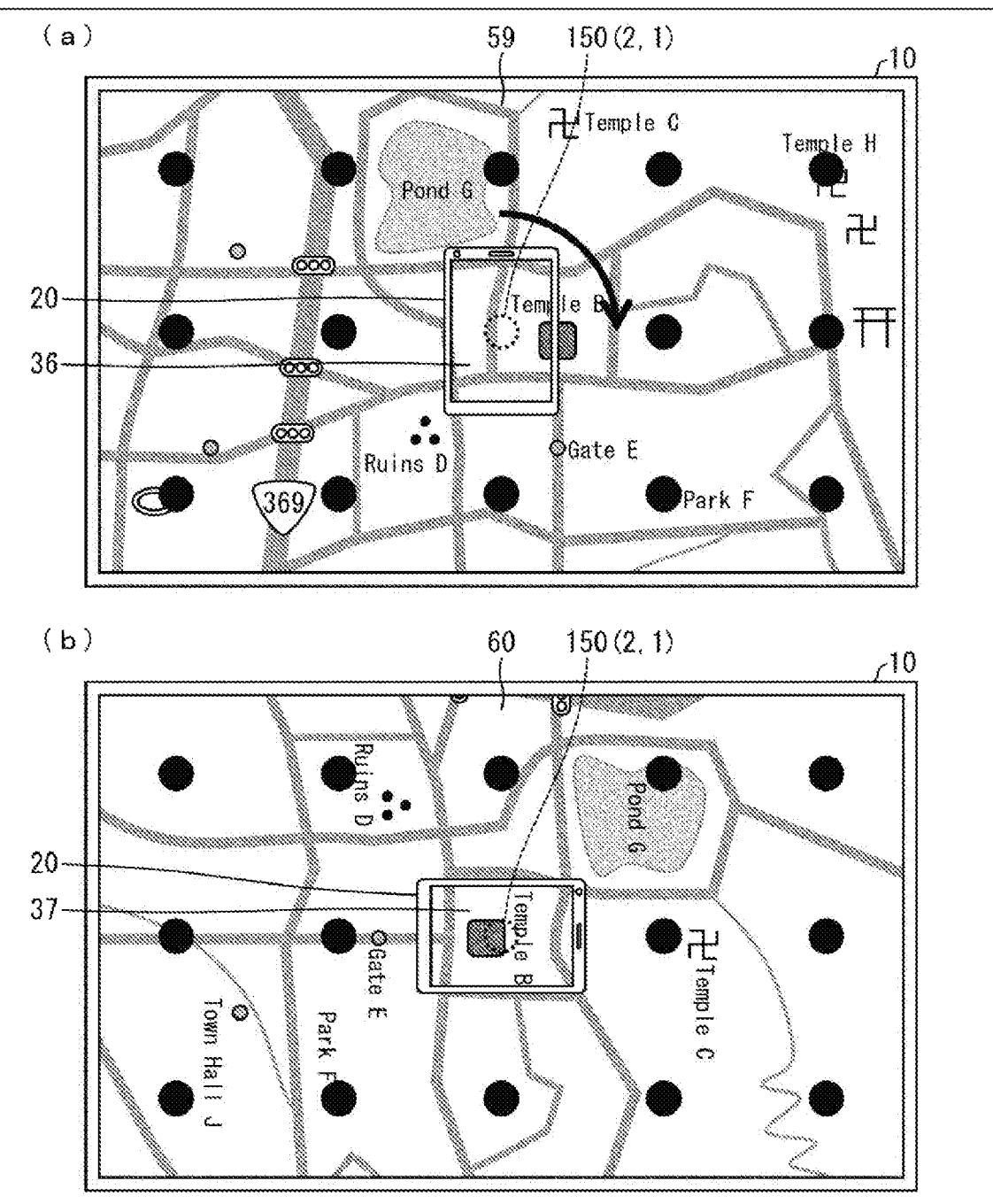
FIG. 12 is a view showing examples of images displayed in the content display system in accordance with Embodiment 3 of the present invention.

The following description will discuss another embodiment of the present invention with reference to FIGS. 10 through 12. The display device 10 can be configured to obtain terminal operation information which indicates a user operation with respect to the mobile terminal 20, and change relevant information in accordance with the terminal operation information. In Embodiment 3, this configuration is described. Note that the terminal operation information is information indicating a user operation with respect to the mobile terminal 20. Specifically, the terminal operation information can be operation information which indicates a content of an operation made by the user with respect to the operation section 232, sensor information obtained via the gyro sensor 240, audio information indicative of voice of the user, and the like.

FIG. 10 is a flow chart illustrating a flow of a process carried out by the display device 10 in accordance with Embodiment 3 of the present invention. The display device 10 in accordance with Embodiment 3 carries out the above described a process shown in FIG. 4, and then carries out a process shown in FIG. 10.

(Step S11)

The NFC communication control section 121 of the display device 10 obtains, via an NFC antenna 150, terminal operation information which indicates a user operation with respect to the mobile terminal 20. The NFC communication control section 121 supplies, to the information output section 123, the terminal operation information which has been obtained and proximity information which indicates the NFC antenna 150 which has obtained the terminal operation information.

(Step S12)

The information output section 123 changes the relevant information, which has been outputted in the step S5, into relevant information that corresponds to the terminal operation information which has been obtained, and outputs the relevant information thus changed.

Example 3 of Relevant Information

The following description will discuss, with reference to FIG. 11, an example of relevant information that is outputted by the display device 10 in Embodiment 3. FIG. 11 is a view showing examples of images displayed in the content display system 1 in accordance with Embodiment 3 of the present invention. (a) of FIG. 11 is a view illustrating a state in which the user carries out a pinch-out operation with respect to the mobile terminal 20, and (b) of FIG. 11 is a view illustrating a state in which relevant information is displayed.

In a case where the terminal operation information which has been obtained indicates a pinch-out operation, the information output section 123 changes a map, which has been outputted as relevant information, into a map that is obtained by enlarging the map on the basis of a point identified by a latitude and a longitude which are associated with an NFC antenna that has obtained the terminal operation information. Moreover, in a case where the terminal operation information which has been obtained indicates a pinch-in operation, the information output section 123 changes a map, which has been outputted as relevant information, into a map that is obtained by shrinking the map on the basis of a point identified by a latitude and a longitude which are associated with an NFC antenna that has obtained the terminal operation information.

Note that the "pinch-out operation" indicates an operation to widen a distance between two fingers of the user while the two fingers are making contact with the touch panel display section 230. Moreover, an operation to narrow a distance between two fingers of the user while the two fingers are making contact with the touch panel display section 230 is referred to as "pinch-in operation".

As illustrated in (a) of FIG. 11, the mobile terminal 20 is in proximity to the NFC antenna 150(3,1), and therefore the display device 10 displays a map 57 which is relevant information. Moreover, the mobile terminal 20 displays a map 34 which is relevant information. Note that the map 34 which is displayed on the mobile terminal 20 is a shrunk map which is obtained by shrinking a map that includes the map 57 which is a display content and a peripheral map (peripheral content) around the map 57. Moreover, in the shrunk map, a range of the map 57 is surrounded by a frame so that the map 57 and the peripheral map can be distinguished from each other in the shrunk map.

In this state, in a case where the user carries out a pinch-out operation as illustrated in (a) of FIG. 11, the operation information obtaining section 224 of the mobile terminal 20 obtains operation information indicative of the pinch-out operation, and supplies the operation information to the obtained information processing section 225. The obtained information processing section 225 supplies, as terminal operation information, the operation information thus obtained to the NFC control section 221. The NFC control section 221 outputs, via the NFC-I/F section 250, the terminal operation information which has been obtained.

In a case where the NFC communication control section 121 of the display device 10 has obtained the terminal operation information via the NFC antenna 150(3,1), the NFC communication control section 121 supplies the terminal operation information to the information output section 123.

In a case where the information output section 123 has obtained the terminal operation information, the information output section 123 outputs relevant information corresponding to the pinch-out operation that is indicated by the terminal operation information. Specifically, the information output section 123 changes the map 57, which is displayed on the display device 10, into a map obtained by enlarging the map 57 on the basis of a point identified by a latitude and a longitude which are associated with the NFC antenna 150(3,1). Then, the information output section 123 supplies, to the display section 130, an image signal which indicates the map thus changed. The display section 130 displays a map 58 which has been enlarged (see (b) of FIG. 11).

Further, the information output section 123 changes the map 34, which is supplied to the mobile terminal 20, into a map obtained by enlarging the map 34 on the basis of a point identified by a latitude and a longitude which are associated with the NFC antenna 150(3,1). Then, the display device 10 supplies, as relevant information, the map thus changed to the mobile terminal 20 via the NFC antenna 150. The mobile terminal 20 displays a map 35 which has been enlarged (see (b) of FIG. 11). Note that the information output section 123 can surround, also in the map 35 which has been enlarged, a region with a frame which region corresponds to the map 58 displayed on the display device 10 (see (b) of FIG. 11).

Example 4 of Relevant Information

The following description will discuss, with reference to FIG. 12, another example of relevant information that is outputted by the display device 10 in Embodiment 3. FIG. 12 is a view showing examples of images displayed in the content display system 1 in accordance with Embodiment 3 of the present invention. (a) of FIG. 12 is a view illustrating a state in which the user carries out an operation to rotate the mobile terminal 20, and (b) of FIG. 12 is a view illustrating a state in which relevant information is displayed. Note that to "rotate" the mobile terminal 20 means to rotate the mobile terminal 20 about a rotation axis that is a normal direction with respect to the display section 130. In other words, "rotation" of the mobile terminal 20 indicates rotation, among any rotations of the mobile terminal 20, of a projection of the mobile terminal 20 onto a plane formed by the display section 130. Moreover, "rotation in a rightward direction" means that the mobile terminal 20 rotates about the axis in a clockwise direction, and "rotation in a leftward direction" means that the mobile terminal 20 rotates about the axis in an anticlockwise direction.

Moreover, in a case where the terminal operation information which has been obtained indicates that the mobile terminal 20 has rotated, the information output section 123 changes a map, which has been outputted as relevant information, into a map that is obtained by rotating the map in the same rotation direction of the mobile terminal 20 by the same angle about a point identified by a latitude and a longitude which are associated with an NFC antenna that has obtained the terminal operation information.

As illustrated in (a) of FIG. 12, the mobile terminal 20 is in proximity to the NFC antenna 150(2,1), and therefore the display device 10 displays a map 59 which is relevant information. Moreover, the mobile terminal 20 displays a map 36 which is relevant information. Note that the map 36 displayed on the mobile terminal 20 is a map in which an object displayed on the NFC antenna 150(2,1) is located at a center of the map 36, and a scale of the map 36 is identical to that of the map 59.

In this state, in a case where the user rotates the mobile terminal 20 by 90 degrees in the rightward direction as indicated by the arrow in (a) of FIG. 12, the sensor information obtaining section 222 of the mobile terminal 20 obtains sensor information which indicates that the mobile terminal 20 has been rotated by 90 degrees in the rightward direction, and the sensor information obtaining section 222 supplies the sensor information which has been obtained to the obtained information processing section 225. The obtained information processing section 225 supplies, as terminal operation information, the sensor information thus obtained to the NFC control section 221. The NFC control section 221 outputs, via the NFC-I/F section 250, the terminal operation information which has been obtained.

The NFC communication control section 121 of the display device 10 obtains the terminal operation information via the NFC antenna 150(2,1) and supplies the terminal operation information to the information output section 123.

In a case where the information output section 123 has obtained the terminal operation information, the information output section 123 outputs relevant information corresponding to the rotation by 90 degrees in the rightward direction, which rotation is indicated by the terminal operation information. Specifically, the information output section 123 changes the map 59, which is displayed on the display device 10, into a map obtained by rotating the map 59 by 90 degrees in the rightward direction about a point identified by a latitude and a longitude which are associated with the NFC antenna 150(2,1). Then, the information output section 123 supplies, to the display section 130, an image signal which indicates the map thus changed. The display section 130 displays a map 60 which has been rotated (see (b) of FIG. 12).

Further, the information output section 123 changes the map 36, which is supplied to the mobile terminal 20, into a map obtained by rotating the map 36 by 90 degrees in the rightward direction about a point identified by a latitude and a longitude which are associated with the NFC antenna 150(3,1). Then, the display device 10 supplies, as relevant information, the map thus changed to the mobile terminal 20 via the NFC antenna 150. The mobile terminal 20 displays a map 37 which has been rotated (see (b) of FIG. 12).

As such, in the content display system 1 in accordance with Embodiment 3, the display device 10 obtains terminal operation information which indicates user operation with respect to the mobile terminal 20, and changes relevant information in accordance with the terminal operation information. This makes it possible to operate a content, which is displayed on the display device 10, as with a content displayed on the mobile terminal 20. Therefore, it is possible to improve user-friendliness.

Embodiment 41

Figure 13:
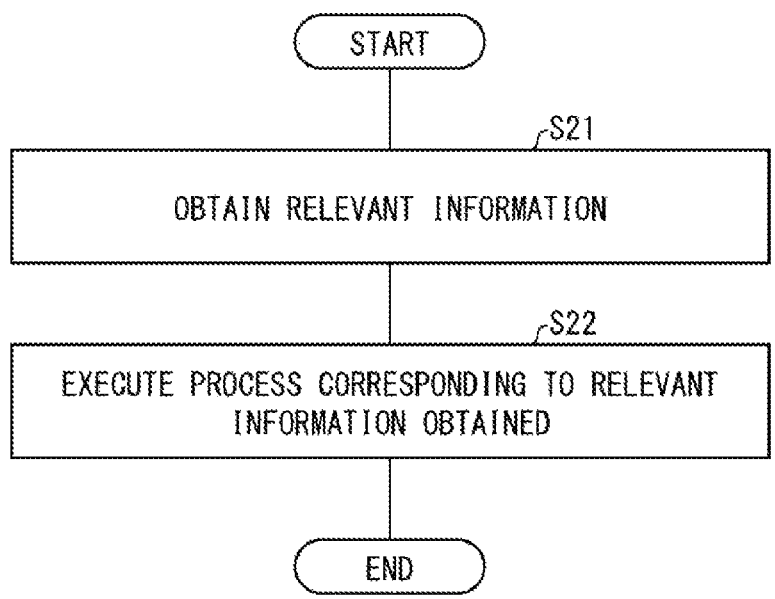
FIG. 13 is a flow chart illustrating a flow of a process carried out by a mobile terminal in accordance with Embodiment 4 of the present invention.
Figure 14:
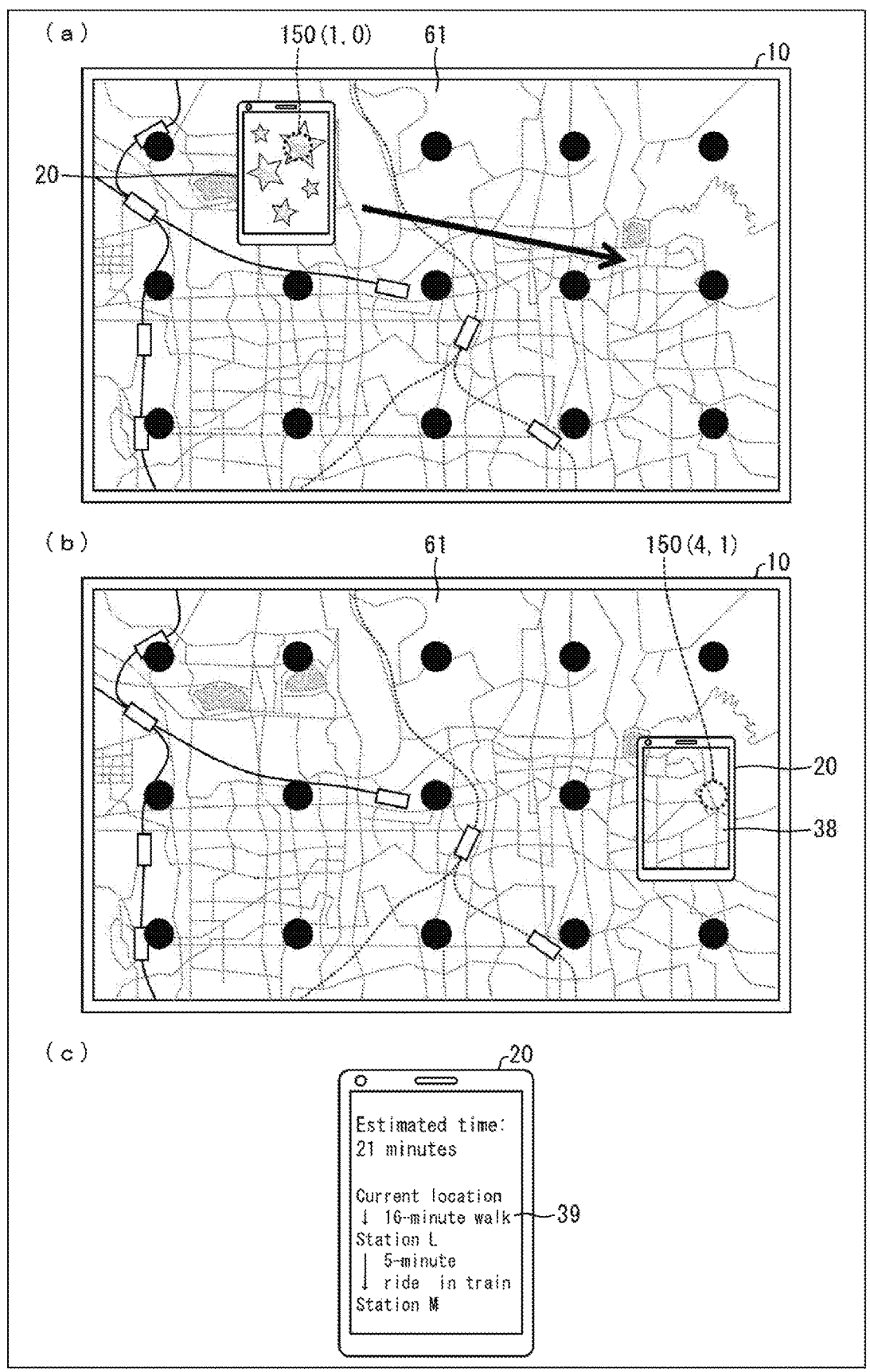
FIG. 14 is a view showing examples of images displayed in a content display system in accordance with Embodiment 4 of the present invention.
Figure 15:
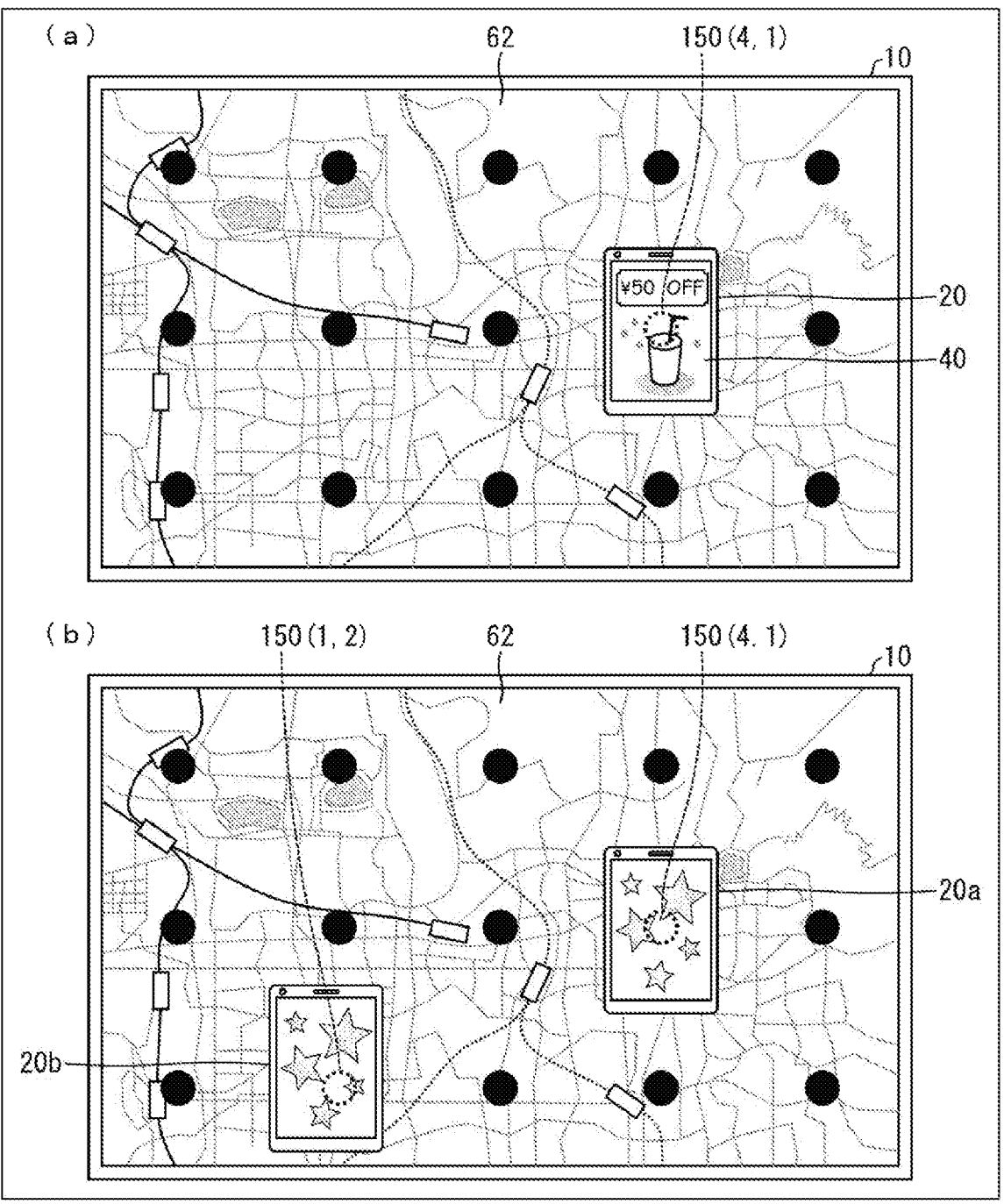
FIG. 15 is a view showing examples of images displayed in a content display system in accordance with Embodiment 4 of the present invention.

The following description will discuss another embodiment of the present invention with reference to FIGS. 13 through 15. The mobile terminal 20 can be configured to process relevant information which has been obtained. In Embodiment 4, this configuration is described.

FIG. 13 is a flow chart illustrating a flow of a process carried out by the mobile terminal 20 in accordance with Embodiment 4 of the present invention. The mobile terminal 20 in accordance with Embodiment 4 carries out a process shown in FIG. 13, after the display device 10 carries out the above described a process shown in FIG. 4.

(Step S21)

In the above described step S5, in a case where the display device 10 has outputted relevant information, the mobile terminal 20 obtains the relevant information. Note that, with regard to the relevant information, it is possible that the NFC control section 221 of the mobile terminal 20 obtains the relevant information via the NFC-I/F section 250, and the NFC control section 221 supplies the relevant information to the obtained information processing section 225. Alternatively, it is possible that the obtained information processing section 225 obtains the relevant information via the mobile terminal communication section 210.

(Step S22)

The obtained information processing section 225 carries out a process corresponding to the relevant information which has been obtained.

Process Example 1

The following description will discuss, with reference to FIG. 14, a process example on relevant information that is carried out by the mobile terminal 20 in Embodiment 4. FIG. 14 is a view showing examples of images displayed in the content display system 1 in accordance with Embodiment 4 of the present invention. (a) of FIG. 14 is a view illustrating a state in which the mobile terminal 20 which has come into proximity to the display device 10 is moved by the user, (b) of FIG. 14 is a view illustrating an image which is displayed after the moving illustrated in (a) of FIG. 14, and (c) of FIG. 14 is a view illustrating an image which is displayed after the mobile terminal 20 has processed relevant information which has been obtained.

As illustrated in (a) of FIG. 14, the mobile terminal 20 is in proximity to the NFC antenna 150(1,0), and therefore the display device 10 supplies, to the mobile terminal 20, relevant information C (relevant information) that indicates a latitude and a longitude which are associated with the NFC antenna 150(1,0). In (a) of FIG. 14, the display device 10 displays a map 61. Note, however, that the relevant information can be displayed on the display section 130. Examples of the relevant information encompass a text image (e.g. "Latitude and longitude are outputted") that indicates a result of outputting relevant information, a text image (e.g. "It's navigation mode") that indicates relevant information to be outputted by the display device 10, and the like.

Next, in a case where the mobile terminal 20 has moved as indicated by the arrow in (a) of FIG. 14, the mobile terminal 20 comes into proximity to the NFC antenna 150(4,1) (see (b) of FIG. 14). Based on this proximity, the display device 10 supplies, to the mobile terminal 20, relevant information D (relevant information) that indicates a latitude and a longitude which are associated with the NFC antenna 150(4,1).

In a case where the mobile terminal 20 has obtained the relevant information C and the relevant information D, the mobile terminal 20 searches for a route whose start point is identified by the latitude and the longitude indicated by the relevant information C and whose end point is identified by the latitude and the longitude indicated by the relevant information D. A method of searching for the route can be a configuration in which the obtained information processing section 225 accesses, via the mobile terminal communication section 210, a network service for searching for a route having the start point and the end point, and thus obtains route information which indicates the route. Then, the obtained information processing section 225 supplies, to the display control section 223, route information which has been obtained. The display control section 223 supplies, to the display section 231, an image signal indicative of a text image containing the route indicated by the route information which has been obtained. The display section 231 displays a text image 39 which contains the route (see (c) of FIG. 14).

Note that it is possible to employ a configuration as follows: that is, in a case where the mobile terminal 20 has come into proximity to the NFC antenna 150(4,1), and then moved and come into proximity to another NFC antenna 150, the mobile terminal 20 obtains relevant information E based on this proximity, and searches for a route whose start point is identified by the latitude and the longitude indicated by the relevant information C, whose relay point is identified by the latitude and the longitude indicated by the relevant information D, and whose end point is identified by a latitude and a longitude indicated by the relevant information E.

In other words, in the display device 10, the NFC communication control section 121 obtains proximity information several times, and the information output section 123 outputs, for each piece of proximity information, object location information (relevant information) on an object that is displayed in a certain range based on an NFC antenna indicated by the each piece of proximity information. Then, the obtained information processing section 225 of the mobile terminal 20 searches for a route which includes points indicated by pieces of object location information in relation to the respective pieces of proximity information, and the display control section 223 controls the display section 231 to display the route.

Process Example 2

The following description will discuss, with reference to FIG. 15, another process example on relevant information that is carried out by the mobile terminal 20 in Embodiment 4. FIG. 15 is a view showing examples of images displayed in the content display system 1 in accordance with Embodiment 4 of the present invention. (a) of FIG. 15 is a view illustrating a state in which the mobile terminal 20 displays relevant information which has been obtained, and (b) of FIG. 15 is a view illustrating a state in which a plurality of mobile terminals obtain pieces of relevant information. Note that, in the process example 2, relevant information which is obtained by the mobile terminal 20 is items, specifically, a right to obtain a coupon and an image of the coupon. Here, in Embodiment 4, the right to obtain a coupon is storage location information indicating a location at which the coupon is stored. Note, however, that the right to obtain a coupon is not limited to this.

As illustrated in (a) of FIG. 15, the mobile terminal 20 is in proximity to the NFC antenna 150(4,1), and therefore the display device 10 supplies, to the mobile terminal 20, storage location information (relevant information) that is associated with the NFC antenna 150(4,1) and the image of the coupon (relevant information). Note that the coupon can be a coupon relevant to a point identified by a latitude and a longitude which are associated with the NFC antenna 150(4,1). For example, the coupon can be a coupon of a store that exists at the point. In a case where the mobile terminal 20 has obtained the right to obtain the coupon and the image of the coupon, the mobile terminal 20 displays the image of the coupon (see (a) of FIG. 15). Further, the mobile terminal 20 obtains the coupon from a storage location which is indicated by the storage location information.

Note that it is possible to employ a configuration in which, in order that the mobile terminal 20 can obtain the coupon only once, the mobile terminal 20 supplies, to the display device 10 via the NFC-I/F section 250, terminal identification information which is information for identifying the mobile terminal 20. In this case, the display device 10 can be configured to supply the coupon only once to the mobile terminal 20 that is identified by the terminal identification information which has been obtained.

As such, in the content display system 1 in accordance with Embodiment 4, the mobile terminal 20 processes the relevant information which has been obtained. This makes it possible to suitably utilize information which is relevant to objects contained in a content displayed on the display device 10.

As illustrated in (b) of FIG. 15, it is possible to employ a configuration in which a plurality of mobile terminals simultaneously carry out short range communication with the NFC antennas 150. For example, as illustrated in (b) of FIG. 15, in a case where a mobile terminal 20*a* is in proximity to the NFC antenna 150(4,1) and a mobile terminal 20*b* is in proximity to the NFC antenna 150(1,2), the display device 10 supplies relevant information associated with the NFC antenna 150(4,1) to the mobile terminal 20*a*, and supplies relevant information associated with the NFC antenna 150(1,2) to the mobile terminal 20*b*. With this configuration, the display device 10 can supply relevant information to the plurality of mobile terminals, and this makes it possible to improve user-friendliness.

Embodiment 5

The embodiments above discussed examples in which a single display device 10 was used. Alternatively, functions of the display device 10 can be achieved by respective individual devices. Even with such a configuration, it is possible, as in the embodiments above, to output, with a simple operation of a user, information which is relevant to an object displayed by a display device.

A configuration in accordance with Embodiment 5 will be described below with reference to another drawing. Note that members similar to the members described above are given respective identical reference signs, and descriptions of those members are omitted.

Figure 16:
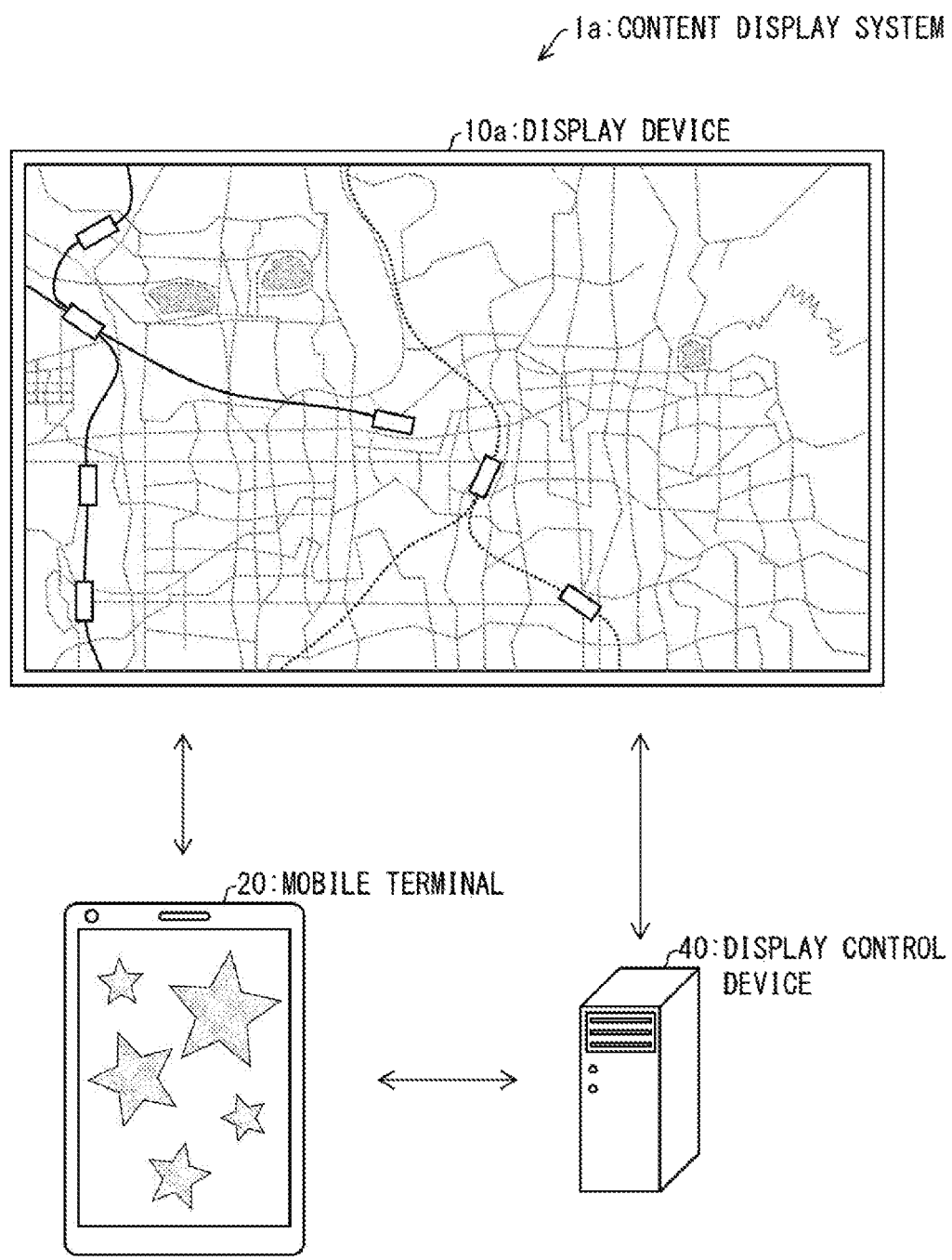
FIG. 16 is a view schematically illustrating a content display system in accordance with Embodiment 5 of the present invention.

FIG. 16 is a view schematically illustrating a content display system (information output system) 1*a* in accordance with Embodiment 5 of the present invention. As illustrated in FIG. 16, the content display system 1*a* includes a display device 10*a*, a display control device 40, and a mobile terminal 20.

Figure 17:
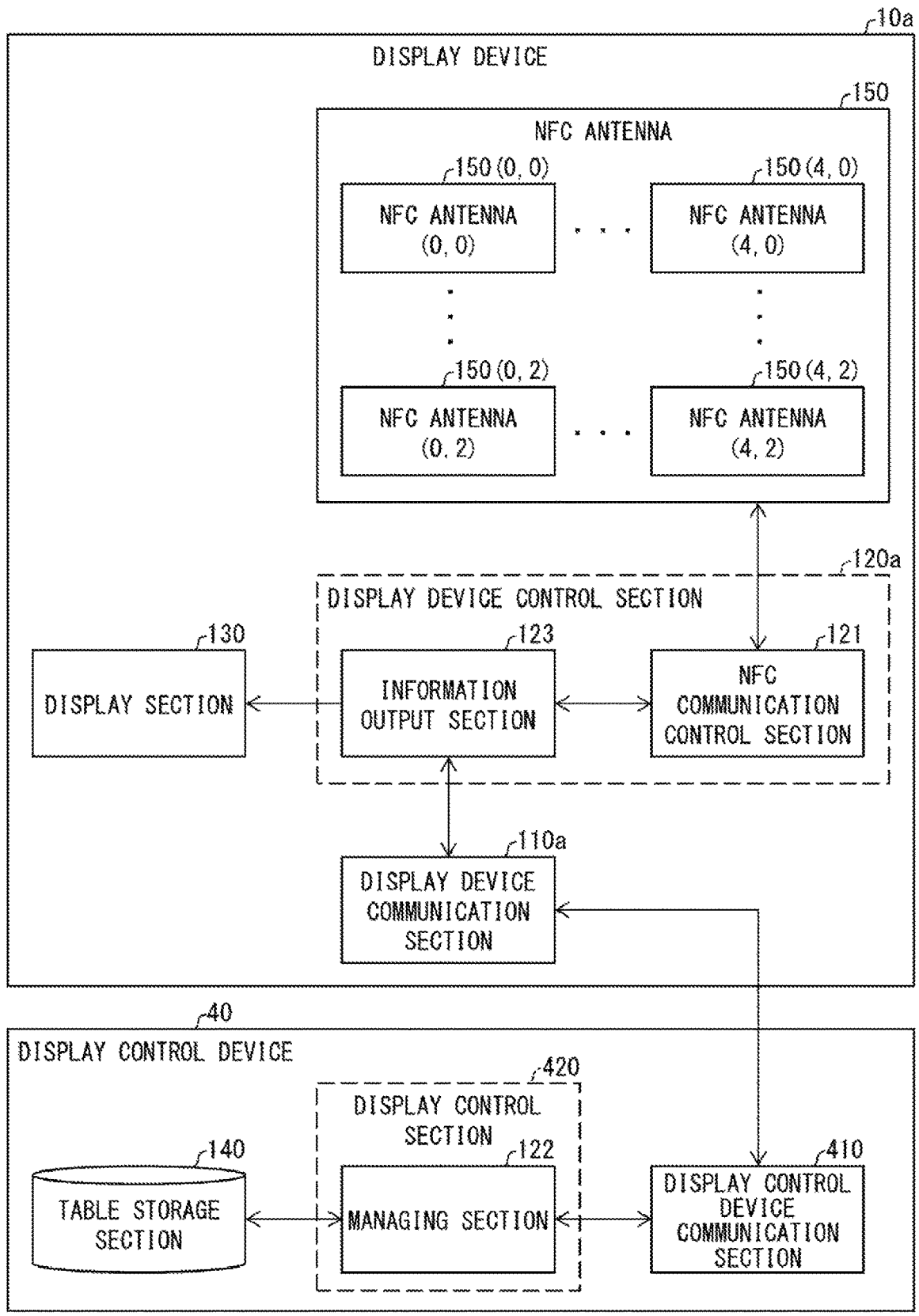
FIG. 17 is a block diagram illustrating main components of a display device and a display control device which are included in the content display system in accordance with Embodiment 5 of the present invention.

FIG. 17 is a block diagram illustrating main components of the display device 10*a* and of the display control device 40.

As illustrated in FIG. 17, the display device 10*a* includes a display device communication section 110*a*, a display device control section 120*a*, a display section 130, and NFC antennas 150. The display device control section 120*a* includes an NFC communication control section 121 and an information output section 123.

As illustrated in FIG. 17, the display control device 40 includes a display control device communication section 410, a display control section 420, and a table storage section 140.

The display control section 420 includes a managing section 122.

The display device communication section 110*a* and the display control device communication section 410 can send and receive information to/from an external device. The display device communication section 110*a* and the display control device communication section 410 are each achieved by, for example, (i) a LAN terminal to which a LAN cable is to be connected or (ii) a wireless LAN interface. Alternatively, the display device communication section 110*a* and the display control device communication section 410 can send and receive information to/from an external device via (i) short range wireless communication such as NFC and Bluetooth (registered trademark) or (ii) Wi-Fi (registered trademark).

According to Embodiment 5, the information output section 123 and the managing section 122, which are included in the display device 10*a* and the display control device 40, respectively, send and receive information via the above-described display device communication section 110*a* and the above-described display control device communication section 410, respectively.

Alternatively, it is possible that a mobile terminal communication section 210 included in the mobile terminal 20 sends and receives information to/from the display device communication section 110*a* or the display control device communication section 410 via (i) short range wireless communication such as NFC and Bluetooth (registered trademark) or (ii) Wi-Fi (registered trademark).

Embodiment 6

The embodiments above discussed examples in which antenna identification information is antenna location information indicative of a location of each of the NFC antennas 150 relative to the display device 10. Note, however, that the invention disclosed herein is not limited to these examples. In Embodiment 6, IDs (also referred to as "antenna ID(s)") assigned to respective NFC antennas 150 are used as antenna identification information.

A schematic configuration of a content display system (information output system) in accordance with Embodiment 6 is similar to that of the content display system 1*a* described in Embodiment 5 with reference to FIG. 16 and FIG. 17, and will therefore be described below with reference to FIG. 16 and FIG. 17 as well. Note that the description below will discuss only part of the configuration which part differs from the embodiments above.

(Information Management Table)

Figures 18, 19:
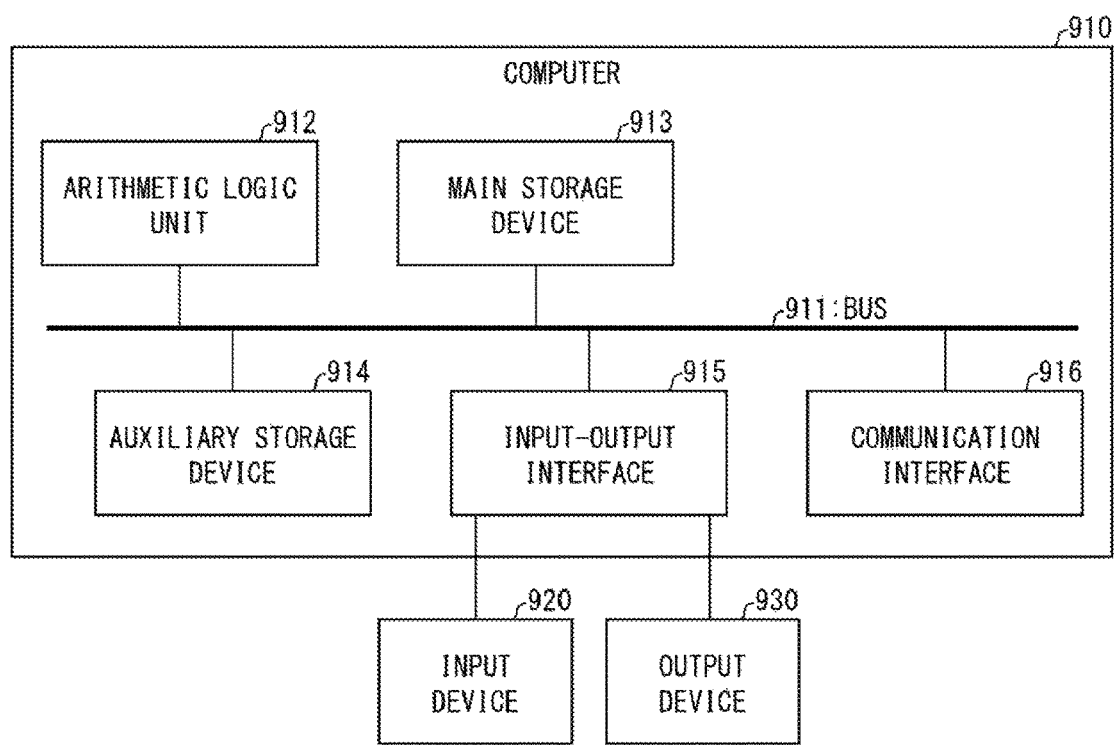
FIG. 18 is a view illustrating an information management table to which a content display system in accordance with Embodiment 6 of the present invention refers.
FIG. 19 is a block diagram illustrating a configuration of a computer which can be used as any of a display device and a mobile terminal in accordance with an embodiment of the present invention.

(a) and (b) of FIG. 18 are views illustrating a first information management table and a second information management table, respectively, which are stored in a table storage section 140.

In the first information management table, the following are associated with each other: (i) antenna IDs, (ii) latitudes and longitudes (object location information) of corresponding objects contained in a display content, and (iii) corresponding pieces of relevant information. Meanwhile, in the second information management table, pieces of antenna location information and corresponding antenna IDs are associated with each other.

The managing section 122 obtains, as proximity information, an antenna ID via at least one of the following two paths.

Path 1: An antenna ID of an NFC antenna 150 to which a mobile terminal 20 has come into proximity is transmitted from a display device 10a to a display control device 40 via wireless communication such as NFC, Bluetooth (registered trademark), or Wi-Fi (registered trademark), and then the managing section 122 obtains the antenna ID.

Path 2: The mobile terminal 20 obtains an antenna ID, via NFC communication, from an NFC antenna 150 to which the mobile terminal 20 has come into proximity, and then the mobile terminal 20 transmits the antenna ID to the display control device 40 via wireless communication such as NFC, Bluetooth (registered trademark), or Wi-Fi (registered trademark), and then the managing section 122 obtains the antenna ID.

By referring to the first information management table, the managing section 122 obtains relevant information associated with the antenna ID thus obtained, and then transmits the relevant information to the display device 10a via a display control device communication section 410.

With such a configuration, it is also possible, as in the embodiments above, to output, with a simple operation of a user, information which is relevant to an object displayed by a display device.

Note that according to Embodiment 6, in a case where a display content displayed on a display section 130 has been scrolled, the managing section 122 preferably updates only the second information management table.

Alternatively, it is possible that, for example, the managing section 122 updates the first information management table and the second information management table each time a user changes (i.e. a mobile terminal changes).

According to the technique disclosed in Patent Literature 3, a value of a tag ID (corresponding to an antenna ID) is fixed. This makes it relatively easy to duplicate a tag having the identical ID, and therefore poses a risk of an unauthorized act such as remotely acquiring information with use of such a duplicated tag. On the other hand, according to Embodiment 6, the managing section 122 updates the first information management table and the second information management table each time a user changes (i.e. a mobile terminal changes). This makes it possible to reduce the possibility that an antenna ID may be duplicated so that information will be acquired without authorization. More specifically, it is possible to prevent a case in which a mobile terminal 20, which has obtained an ID of an NFC antenna 150 through short range communication with the NFC antenna 150, uses the ID without authorization (e.g. remotely operates a display device 10).

Embodiment 7

Blocks of each of a display device 10, a display device 10a, a display control device 40, and a mobile terminal 20 (particularly a display device control section 120, a display device control section 120a, a display control section 420, and a mobile terminal control section 220) can be realized by a logic circuit (hardware) provided in an integrated circuit (IC chip) or the like or can be alternatively realized by software as executed by a central processing unit (CPU). In the latter case, each of the display device 10, the display device 10a, the display control device 40, and the mobile terminal 20 can be configured with use of a computer (electronic calculator) as illustrated in FIG. 19.

FIG. 19 is a block diagram illustrating a configuration of a computer 910 which can be used as any of the display device 10 and the mobile terminal 20 in accordance with an embodiment of the present invention. The computer 910 includes an arithmetic logic unit 912, a main storage device 913, an auxiliary storage device 914, an input-output interface 915, and a communication interface 916 which are connected to each other via a bus 911. Each of the arithmetic logic unit 912, the main storage device 913, and the auxiliary storage device 914 can be a CPU, a Random Access Memory (RAM), or a hard disk drive. The input-output interface 915 is connected with (i) an input device 920 via which a user is to input various pieces of information into the computer 910 and (ii) an output device 930 via which the computer 910 is to output various pieces of information to the user. Each of the input device 920 and the output device 930 can be included in the computer 910 or can be connected to the computer 910 (externally attached to the computer 910). For example, the input device 920 can be a keyboard, a mouse, a touch sensor, or the like, and the output device 930 can be a display, a printer, a speaker, or the like. Alternatively, it is also possible to employ a device having both a function of the input device 920 and a function of the output device 930 (such as a touch panel obtained by integrating a touch sensor and a display). The communication interface 916 is an interface via which the computer 910 communicates with an external device.

The auxiliary storage device 914 stores therein various control programs for causing the computer 910 to operate as any of the display device 10, the display device 10a, the display control device 40, and the mobile terminal 20. The arithmetic logic unit 912 loads, in the main storage device 913, the various control programs stored in the auxiliary storage device 914, and executes a command included in each of the various control programs so that the computer 910 functions as each section of any of the display device 10, the display device 10a, the display control device 40, and the mobile terminal 20. Note that a recording medium which the auxiliary storage device 914 includes to record information, such as the various control programs, only needs to be a computer-readable "non-transitory tangible medium". Examples of the recording medium encompass tapes, disks, cards, semiconductor memories, and programmable logic circuits.

The various control programs can be obtained from an outside of the computer 910. In this case, the various programs can be obtained via any transmission medium (such as a communications network or a broadcast wave). The present invention can also be achieved in the form of a data signal in which the various control programs are embodied via electronic transmission and which is embedded in a carrier wave.

[Recapitulation]

An information output system (display device 10) in accordance with Aspect 1 of the present invention includes a display device (10) including one or more antennas (NFC antennas 150) which carry out short range communication;

a managing section (122) which manages (i) pieces of antenna identification information associated with respective ones of the one or more antennas and (ii) pieces of object location information that indicate locations of objects which locations are relative to a content in which the objects are contained, such that each of the pieces of the antenna identification information associated with a corresponding one of the one or more antennas is associated with one or more of the pieces of the object location information on corresponding one or more of the objects displayed within a certain range on the display device, which certain range is based on the corresponding one of the one or more antennas; a proximity information obtaining section (NFC communication control section 121) which obtains proximity information that indicates an antenna, among the one or more antennas, to which a mobile terminal (20) has come into proximity; and an output section (information output section 123) which outputs relevant information associated with a piece of the object location information which piece indicates an object that is displayed within a certain range based on the antenna indicated by the proximity information.

According to the configuration, even in a case where an object to be displayed by the display device is changed, object location information of the object which is newly displayed is associated with antenna identification information. Further, since relevant information which is associated with the object location information that has been changed is outputted, and it is possible to output information that is relevant to the object, regardless of the change in object which is displayed by the display device. In addition, since relevant information is outputted in response to the mobile terminal coming into proximity to the display device, it is possible to output, with a simple operation of a user, information which is relevant to an object displayed by the display device.

In Aspect 2 of the present invention, the information output system can be arranged so that, in Aspect 1 of the present invention, the pieces of the antenna identification information are information indicative of locations of the respective ones of the one or more antennas, which locations are relative to the display device.

With the configuration, it is possible to bring about advantageous effects similar to those of the antenna identification information in Aspect 1.

In Aspect 3 of the present invention, the information output system can be arranged so that, in Aspect 1 or 2 of the present invention, the proximity information obtaining section obtains the proximity information from the mobile terminal.

In Aspect 4 of the present invention, the information output system can be arranged so that, in any one of Aspects 1 through 3 of the present invention, the relevant information is information which is relevant to the object at a location indicated by the piece of the object location information which piece is associated with the relevant information.

According to the configuration, information which is relevant to an object displayed at a location to which the mobile terminal has come into proximity is outputted. This makes it possible to output relevant information with an intuitive operation of a user.

In Aspect 5 of the present invention, the information output system can be arranged so that, in any one of Aspects 1 through 4 of the present invention, the relevant information is a content obtained by subjecting a content, which is actually displayed on the display device, to at least one of translation, rotation, enlargement, and shrinkage.

With the configuration, it is possible to provide a content which is easily viewable to a user.

In Aspect 6 of the present invention, the information output system can be arranged so that, in any one of Aspects 1 through 5 of the present invention, after the output section outputs the relevant information, the output section outputs new relevant information which is based on new proximity information further obtained by the proximity information obtaining section.

With the configuration, it is possible to output relevant information which corresponds to change in location of a mobile terminal which has come into proximity.

In Aspect 7 of the present invention, the information output system can be arranged so as to, in any one of Aspects 1 through 6 of the present invention, further include: a terminal operation information obtaining section (NFC communication control section 121, information output section 123) which obtains, from the mobile terminal, terminal operation information showing an operation which a user carried out on the mobile terminal, the output section outputting relevant information which is based on terminal operation information obtained by the terminal operation information obtaining section.

With the configuration, it is possible to operate, by operating a mobile terminal, a content which is displayed by a display device.

In Aspect 8 of the present invention, the information output system can be arranged so that, in Aspect 7 of the present invention: in a case where terminal operation information obtained by the terminal operation information obtaining section shows a pinch-in operation, the output section outputs, as the relevant information, a content obtained by subjecting, to shrinkage, a content displayed on the display device; and in a case where the terminal operation information obtained by the terminal operation information obtaining section shows a pinch-out operation, the output section outputs, as the relevant information, a content obtained by subjecting, to enlargement, the content displayed on the display device.

With the configuration, a content, which is displayed by a display device, can be (i) shrunk by a pinch-in operation on a mobile terminal and (ii) enlarged by a pinch-out operation on the mobile terminal.

In Aspect 9 of the present invention, the information output system can be arranged so that, in Aspect 7 or 8 of the present invention, in a case where operation information obtained by the terminal operation information obtaining section shows an operation to rotate the mobile terminal, the output section outputs, as the relevant information, a map obtained by subjecting, to rotation, a map which is displayed on the display device.

With the configuration, a content, which is displayed by a display device, can be rotated in conjunction with a rotation of a mobile terminal.

In Aspect 10 of the present invention, the information output system can be arranged so that, in any one of Aspects 1 through 9 of the present invention, the output section supplies the relevant information to the mobile terminal.

With the configuration, it is possible to supply, to a mobile terminal, (i) a content which is displayed by a display device and (ii) relevant information which is relevant to an object contained in the content.

In Aspect 11 of the present invention, the information output system can be arranged so that, in Aspect 10 of the present invention, the relevant information is a shrunk content obtained by subjecting, to shrinkage, a content including a display target content which is actually displayed on the display device and a peripheral content which is (i) not displayed on the display device and (ii) located in the vicinity of the display target content.

With the configuration, what is supplied to a mobile terminal is a shrunk content which (i) contains not only a display target content displayed by a display device but also a peripheral content and (ii) is further shrunk. This allows an overall content to be displayed by the mobile terminal while allowing the display device to display the display target content containing the details of an object included in the content.

In Aspect 12 of the present invention, the information output system can be arranged so that, in Aspect 11 of the present invention, the shrunk content, which is the relevant information, allows the display target content and the peripheral content to be distinguished from each other.

With the configuration, a mobile terminal displaying an overall content can easily inform a user of a range of a display target content.

In Aspect 13 of the present invention, the information output system can be arranged so that, in any one of Aspects 1 through 12 of the present invention, the output section supplies the relevant information to the display device.

With the configuration, a display device can display relevant information.

In Aspect 14 of the present invention, the information output system can be arranged so that, in any one of Aspects 1 through 13 of the present invention: the content is a map; and the pieces of the object location information indicate latitudes of and longitudes of objects contained in the map.

According to the configuration, a map is displayed by a display device, and then relevant information is associated with a latitude and a longitude of an object to which a mobile terminal has come into proximity. This allows, for example, detailed information such as a landmark on the map to be outputted as relevant information.

An information output system (content display system 1) in accordance with Aspect 15 of the present invention includes: a display device (10) including one or more antennas (NFC antennas 150) which carry out short range communication; and a mobile terminal (20) including an antenna (NFC-I/F section 250) which carries out short range communication, the display device further including a managing section (122) which manages (i) pieces of antenna identification information associated with respective ones of the one or more antennas and (ii) pieces of object location information that indicate locations of objects which locations are relative to a content in which the objects are contained, such that each of the pieces of the antenna identification information associated with a corresponding one of the one or more antennas is associated with one or more of the pieces of the object location information on corresponding one or more of the objects displayed within a certain range on the display device, which certain range is based on the corresponding one of the one or more antennas; a proximity information obtaining section (NFC communication control section 121) which obtains proximity information that indicates an antenna, among the one or more antennas, to which the mobile terminal has come into proximity, and an output section (information output section 123) which outputs relevant information associated with a piece of the object location information which piece indicates an object that is displayed within a certain range based on the antenna indicated by the proximity information, the mobile terminal further including a relevant information obtaining section (obtained information processing section 225) which obtains the relevant information.

With the configuration, it is possible to bring about advantageous effects similar to those of Aspect 1.

In Aspect 16 of the present invention, the information output system can be arranged so that, in Aspect 15 of the present invention, the mobile terminal further includes a relevant information processing section (obtained information processing section 225) which processes the relevant information obtained by the relevant information obtaining section.

With the configuration, relevant information obtained by a mobile terminal can be suitably used.

In Aspect 17 of the present invention, the information output system can be arranged so that, in Aspect 16 of the present invention: the display device operates so that (i) the proximity information obtaining section obtains pieces of proximity information at respective times and (ii) the output section outputs, as the relevant information for each of the pieces of the proximity information, each of pieces of object location information on an object displayed within a certain range based on an antenna indicated by the each of the pieces of the proximity information; and the relevant information processing section of the mobile terminal searches for and displays a route which includes points indicated by the pieces of the object location information based on the respective pieces of the proximity information.

With the configuration, it is possible to search for a route from one point to the other point of two points displayed by a display device, and to present the path to a user.

In Aspect 18 of the present invention, the information output system can be arranged so that, in Aspect 16 of the present invention, the relevant information is an item associated with the object that is displayed within the certain range based on the antenna indicated by the proximity information.

With the configuration, it is possible to output, for example, a coupon of a store which is displayed by a display device.

A method in accordance with Aspect 19 of the present invention is a method of controlling an information output system, the information output system including: a display device including one or more antennas which carry out short range communication, the method including the steps of: managing (i) pieces of antenna identification information associated with respective ones of the one or more antennas and (ii) pieces of object location information that indicate locations of objects which locations are relative to a content in which the objects are contained, such that each of the pieces of the antenna identification information associated with a corresponding one of the one or more antennas is associated with one or more of the pieces of the object location information on corresponding one or more of the objects displayed within a certain range on the display device, which certain range is based on the corresponding one of the one or more antennas; obtaining proximity information which indicates an antenna, among the one or more antennas, to which a mobile terminal has come into proximity; and outputting relevant information associated with a piece of the object location information which piece indicates an object that is displayed within a certain range based on the antenna indicated by the proximity information.

With the configuration, it is possible to bring about advantageous effects similar to those of Aspect 1.

The information output system in accordance with the foregoing aspects of the present invention can be achieved by a computer. In such a case, the present invention encompasses: a control program for the information output system which program controls a computer to operate as the foregoing sections (software elements) of the information output system so that the information output system can be achieved by the computer; and a computer-readable recording medium in which the control program is recorded.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

The present invention can be used for, for example, a display device including an NFC antenna.

REFERENCE SIGNS LIST 1, 1a Content display system (information output system)
10, 10a Display device (information output system)
110, 110a Display device communication section
120, 120a Display device control section
121 NFC communication control section (proximity information obtaining section, terminal operation information obtaining section)
122 Managing section
123 Information output section (output section, terminal operation information obtaining section)
130 Display section
140 Table storage section
150 NFC antenna
20 Mobile terminal
210 Mobile terminal communication section
220 Mobile terminal control section
221 NFC control section
222 Sensor information obtaining section
223 Display control section
224 Operation information obtaining section
225 Obtained information processing section
230 Touch panel display section
231 Display section
232 Operation section
240 Gyro sensor
250 NFC-I/F section
40 Display control device
410 Display control device communication section
420 Display control section

The invention claimed is:

1. An information output system comprising:
a display device including one or more antennas which carry out short range communication;
a managing circuitry which manages (i) an antenna identification information associated with respective ones of the one or more antennas and (ii) an object location information that indicate locations of the objects included in a content, such that each of the antenna identification information is associated with one or more of the object location information that correspond to one or more of the objects displayed within a certain range on the display device, wherein the certain range is based on the corresponding one of the one or more antennas;
a proximity information obtaining circuitry which obtains proximity information that indicates the antenna, among the one or more antennas, to which a mobile terminal has come into proximity; and
an output circuitry which outputs relevant information associated with the object location information which indicates the object that is displayed within the certain range based on the antenna indicated by the proximity information,
wherein the display device operates so that (a) the proximity information obtaining circuitry obtains proximity information at respective times and (b) the output circuitry outputs, as the relevant information for each of the proximity information, each of the object location information on the object displayed within the certain range based on the antenna indicated by the each of the proximity information.

2. The information output system as set forth in claim 1, wherein
the antenna identification information are information indicative of locations of the respective ones of the one or more antennas, which locations are relative to the display device.

3. The information output system as set forth in claim 1, wherein
the proximity information obtaining circuitry obtains the proximity information from the mobile terminal.

4. The information output system as set forth in claim 1, wherein
the relevant information is information which is relevant to the object at a location indicated by the object location information which is associated with the relevant information.

5. The information output system as set forth in claim 1, wherein
the relevant information is a content obtained by subjecting the content, which is actually displayed on the display device, to at least one of translation, rotation, enlargement, and shrinkage.

6. The information output system as set forth in claim 1, wherein
after the output circuitry outputs the relevant information, the output circuitry outputs new relevant information which is obtained by changing the relevant information according to new proximity information further obtained by the proximity information obtaining circuitry.

7. The information output system as set forth in claim 1, further comprising:
a terminal operation information obtaining circuitry which obtains, from the mobile terminal, terminal operation information showing an operation which a user carried out on the mobile terminal,
the output circuitry outputting relevant information which is based on terminal operation information obtained by the terminal operation information obtaining circuitry.

8. The information output system as set forth in claim 7, wherein:
in a case where terminal operation information obtained by the terminal operation information obtaining circuitry shows a pinch-in operation, the output circuitry outputs, as the relevant information, a content obtained by subjecting, to shrinkage, the content displayed on the display device; and
in a case where the terminal operation information obtained by the terminal operation information obtaining circuitry shows a pinch-out operation, the output circuitry outputs, as the relevant information, the content obtained by subjecting, to enlargement, the content displayed on the display device.

9. The information output system as set forth in claim 7, wherein in a case where operation information obtained by the terminal operation information obtaining circuitry shows an operation to rotate the mobile terminal, the output circuitry outputs, as the relevant information, a map obtained by subjecting, to rotation, a map which is displayed on the display device.

10. The information output system as set forth in claim 1, wherein the relevant information is a shrunk content obtained by subjecting, to shrinkage, the content including
a display target content which is actually displayed on the display device and
a peripheral content which is not displayed on the display device and located in the vicinity of the display target content.

11. The information output system as set forth in claim 10, wherein the shrunk content, which is the relevant information, allows the display target content and the peripheral content to be distinguished from each other.

12. The information output system as set forth in claim 1, wherein the output circuitry supplies the relevant information to the display device.

13. The information output system as set forth in claim 1, wherein:

the content is a map; and
the object location information indicate latitudes and longitudes of objects contained in the map.

14. An information output system comprising:

a display device including one or more antennas which carry out short range communication; and
a mobile terminal including an antenna which carries out short range communication,
said display device further including
a managing circuitry which manages (i) the antenna identification information associated with respective ones of the one or more antennas and (ii) an object location information that indicate locations of the objects included in a content, such that each of the antenna identification information is associated with one or more of the object location information that correspond to one or more of the objects displayed within a certain range on the display device, wherein the certain range is based on the corresponding one of the one or more antennas,
a proximity information obtaining circuitry which obtains proximity information that indicates the antenna, among the one or more antennas, to which the mobile terminal has come into proximity, and
an output circuitry which outputs relevant information associated with the object location information which indicates the object that is displayed within the certain range based on the antenna indicated by the proximity information, and said mobile terminal further including
a relevant information obtaining circuitry which obtains the relevant information,
wherein the mobile terminal further includes a relevant information processing circuitry which processes the relevant information obtained by the relevant information obtaining circuitry,
wherein the display device operates so that (a) the proximity information obtaining circuitry obtains proximity information at respective times and (b) the output circuitry outputs, as the relevant information for each of the proximity information, each of the object location information on the object displayed within the certain range based on the antenna indicated by the each of the proximity information; and
the relevant information processing circuitry of the mobile terminal searches for and displays a route which includes points indicated by the object location information based on the respective proximity information.

15. The information output system as set forth in claim 14, wherein the relevant information is an item associated with the object that is displayed within the certain range based on the antenna indicated by the proximity information.

16. A method of controlling an information output system, said information output system comprising:
a display device including one or more antennas which carry out short range communication,
said method comprising the steps of:
managing (i) an antenna identification information associated with respective ones of the one or more antennas and (ii) an object location information that indicate locations of the objects included in a content, such that each of the antenna identification information is associated with one or more of the object location information that correspond to one or more of the objects displayed within a certain range on the display device, wherein the certain range is based on the corresponding one of the one or more antennas;
obtaining proximity information which indicates the antenna, among the one or more antennas, to which a mobile terminal has come into proximity; and
outputting relevant information associated with the object location information which indicates the object that is displayed within the certain range based on the antenna indicated by the proximity information;
wherein the display device (a) obtains proximity information at respective times and (b) outputs, as the relevant information for each of the proximity information, each of the object location information on the object displayed within the certain range based on the antenna indicated by the each of the proximity information.

* * * * *